US009369272B2

(12) United States Patent
Tang et al.

(10) Patent No.: US 9,369,272 B2
(45) Date of Patent: Jun. 14, 2016

(54) SERIAL TIME-DIVISION-MULTIPLEXED BUS WITH BIDIRECTIONAL SYNCHRONIZATION/CONTROL WORD LINE

(71) Applicant: QUALCOMM Incorporated, San Diego, CA (US)

(72) Inventors: Zhilong Tang, Irvine, CA (US); Khosro Mohammad Rabii, San Diego, CA (US); Matthew David Sienko, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 14/227,235

(22) Filed: Mar. 27, 2014

(65) Prior Publication Data

US 2015/0280904 A1 Oct. 1, 2015

(51) Int. Cl.
*G06F 1/12* (2006.01)
*G06F 13/42* (2006.01)
*H04L 7/04* (2006.01)
*G06F 11/10* (2006.01)
*H04J 3/06* (2006.01)

(52) U.S. Cl.
CPC ............ *H04L 7/048* (2013.01); *G06F 11/1004* (2013.01); *G06F 13/4286* (2013.01); *G06F 13/4295* (2013.01); *H04J 3/0644* (2013.01); *H04J 3/0652* (2013.01)

(58) Field of Classification Search
CPC ..... G06F 13/4295; H04L 7/048; H04J 3/0652
USPC .......................................... 713/400, 500, 502
See application file for complete search history.

(56) References Cited

U.S. PATENT DOCUMENTS

| 6,434,650 | B1 | 8/2002 | Morris et al. |
| 6,665,757 | B1 | 12/2003 | Tsujita et al. |
| 6,772,251 | B1 | 8/2004 | Hastings et al. |
| 2013/0019038 | A1 | 1/2013 | Gruber et al. |
| 2013/0237285 | A1 | 9/2013 | Sinai |
| 2013/0322439 | A1 | 12/2013 | Verhallen et al. |
| 2013/0322462 | A1 | 12/2013 | Poulsen |
| 2014/0002585 | A1 | 1/2014 | Leviav et al. |

OTHER PUBLICATIONS

International Search Report and Written Opinion—PCT/US2015/023122—ISA/EPO—Jul. 8, 2015.

*Primary Examiner* — Michael J Brown
(74) *Attorney, Agent, or Firm* — Loza & Loza, LLP

(57) ABSTRACT

One feature pertains to the synchronization of a serial time-division-multiplexed bus interconnecting an audio processing subsystem (i.e. a local node) with an audio coder-decoder (CODEC) subsystem (i.e. a remote node.) Control signals are transmitted along a bidirectional transmission line of the bus from the audio processing subsystem to the audio CODEC subsystem. The audio processing subsystem tracks an internal state machine phase count as the control signals are transmitted. The audio CODEC subsystem also tracks an internal state machine phase count as the signals are received. Transmission of control signals by the audio processing subsystem is periodically paused or suspended for a fixed interval of time based on the phase count to allow the audio CODEC subsystem to send a synchronization indicator signal back to the audio processing subsystem, which the audio processing subsystem uses to verify synchronization. This may be performed, for example, once every one hundred-twenty phase counts.

30 Claims, 17 Drawing Sheets

SERIAL TIME-DIVISION-MULTIPLEXED BUS WITH BIDIRECTIONAL SYNCHRONIZATION/CONTROL WORD LINE

BACKGROUND

1. Field

Various features relate to serial time-division-multiplexed (TDM) bus systems, particularly audio TDM bus systems for use with wireless computing devices.

2. Background

Advances in technology have resulted in smaller and more powerful mobile or wireless computing devices such as mobile telephones, personal digital assistants and tablet computers. Mobile telephones and tablet computers can communicate voice and data packets over wireless networks. Further, many wireless devices include component devices incorporated therein such as digital still cameras, digital video cameras, digital recorders and audio file players. Also, wireless devices can process executable instructions to provide web browser applications or other software applications.

Insofar as audio processing is concerned, wireless devices can include an audio coder/decoder (CODEC) subsystem and a separate audio processing subsystem. The audio CODEC subsystem may include, for example, one or more CODECs, microphones (MICS), a headphone interface (HPH I/F) and one or more speakers. The audio CODEC subsystem receives audio data from the audio processing subsystem, which is in turn connected to other components of the wireless device. A bus may be provided between the audio CODEC subsystem and the audio processing subsystem such as a Serial Low-power Inter-chip Media Bus (SLIMbus) or other serial time-division-multiplexed (TDM) bus system. The audio CODEC subsystem and the audio processing subsystem may be regarded as state machines that need to be synchronized with one another. In current devices, synchronization is typically performed on every clock cycle of the bus with considerable corresponding software overhead including packet framing and the like.

Therefore, there is a need to provide improved TDM bus systems for use with wireless devices.

SUMMARY

In one aspect, a method for controlling a serial time-division-multiplexed (TDM) bus operable by a first device connected to the bus includes: transmitting control signals along a bidirectional transmission line of the bus to a second device also connected to the bus; tracking a phase count of the first device as the control signals are transmitted to the second device along the bidirectional transmission line; temporarily suspending the transmission of the control signals based on the phase count to allow the first device to obtain a synchronization indicator signal from the second device along the bidirectional transmission line; and verifying synchronization of the first and second devices based on whether a synchronization indicator signal is obtained from the second device while transmission is temporarily suspended by the first device.

In another aspect, a processing circuit of a first device coupled to a serial time-division-multiplexed (TDM) bus having a bidirectional transmission line is configured to: transmit control signals along the bidirectional transmission line to a second device; track a phase count as the control signals are transmitted to the second device along the bidirectional transmission line; temporarily suspend the transmission of the control signals based on the phase count to allow the first device to obtain a synchronization indicator signal from the second device along the bidirectional transmission line; and verify synchronization with the second device based on whether a synchronization indicator signal is obtained from the second device while transmission is temporarily suspended.

In yet another aspect, a device includes: means for transmitting control signals along a bidirectional transmission line of the bus to a second state machine also connected to the bus; means for tracking a phase count of the first state machine as the control signals are transmitted to the second state machine along the bidirectional transmission line; means for temporarily suspending the transmission of the control signals based on the phase count to allow the first device to obtain a synchronization indicator signal from the second state machine along the bidirectional transmission line; and means for verifying synchronization of the first and second state machines based on whether a synchronization indicator signal is obtained from the second state machine while transmission is temporarily suspended by the first state machine.

In still yet another aspect, a processor-readable storage medium has one or more instructions which when executed by at least one processing circuit causes the at least one processing circuit to: transmit control signals along a bidirectional transmission line of a serial time-division-multiplexed (TDM) bus from a first device to a second device; track a phase count of the first device as the control signals are transmitted to the second device along the bidirectional transmission line; temporarily suspend the transmission of the control signals based on the phase count to allow the first device to allow the first device to obtain a synchronization indicator signal from the second device along the bidirectional transmission line; and verify synchronization of the first and second devices based on reception of a synchronization indicator signal from the second device while transmission is temporarily suspended by the first device.

DETAILED DESCRIPTION

Figure 1:
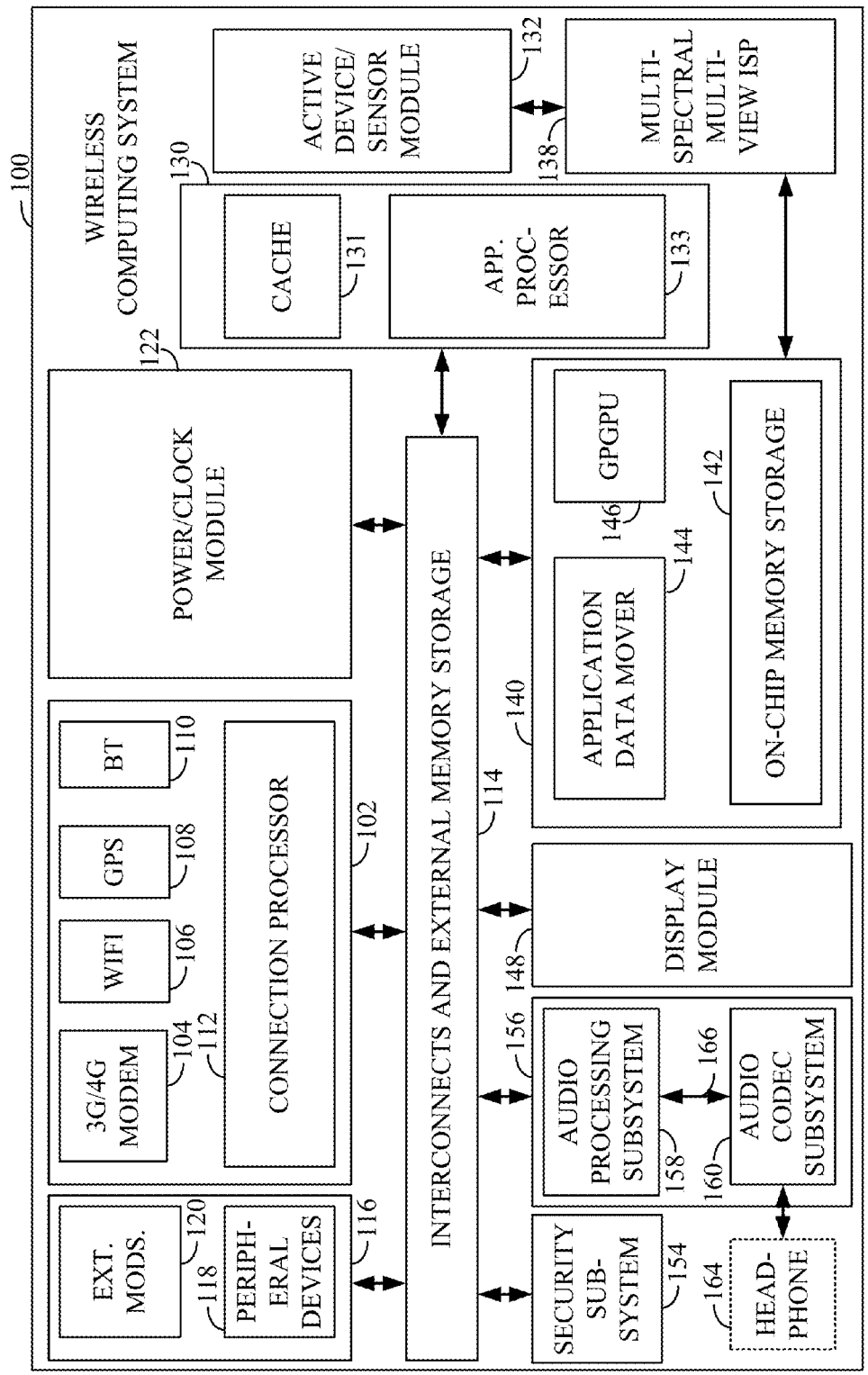
FIG. 1 illustrates a computing platform processing system of a mobile communication device in accordance with an illustrative example.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Several novel features pertain to devices and methods for use with a serial TDM bus. The novel features may be used in one or more devices or state machines connected to the bus, such as the state machines of audio processing subsystems and audio CODEC subsystems, but are applicable in a wide range of systems, apparatus and devices and to achieve a variety of goals.

In one aspect, control signals are transmitted along a bidirectional transmission line of the TDM bus from a state machine of the audio processing subsystem (i.e. a local node) to a state machine of the audio CODEC subsystem (i.e. a remote node.) Herein, the bidirectional transmission line may also be referred to as a bidirectional SYNC/CW line, particularly in examples where the line is provided to transmit SYNC signals and control words (CWs.) The local node tracks a phase count of its state machine as the control signals are transmitted to the remote node. The remote node also tracks a phase count of its own state machine as the control signals are received. A phase count may be, for example, the bit count of the control signals being transmitted over the bidirectional transmission line. The transmission of control signals by the local node is temporarily suspended or paused for an interval of time (e.g. one clock cycle) to allow the remote node to send a synchronization indicator signal (e.g. a SYNC signal) back to the local node. This is performed once every N phase counts of the state machine of the remote node where N may be, e.g., 120.

The local node then verifies synchronization based on reception of a SYNC signal during the interval when transmission by the local node is temporarily suspended. In this regard, the local node detects that the bus is properly synchronized (i.e. the local and remote nodes are in sync) if a SYNC signal is received by the local node during the interval while transmission is temporarily suspended. Conversely, the local node detects that the bus is not synchronized (i.e. the two nodes are out of sync) if a SYNC signal is not received during the interval while transmission is temporarily suspended. In this manner, so long as both the local and remote node state machines are at the same phase count, the remote node will transmit the synchronization indicator signal during the interval of time when the local node has paused transmission. The local node will thereby receive the SYNC signal and verify that the bus is properly synchronized. If the state machines of the local and remote nodes drift out of synchronization and are no longer at the same phase count, the remote node will not transmit the SYNC signal during the interval of time when the local node has paused transmission. The local node will thereby not receive the SYNC signal during that interval and will thereby detect the lack of synchronization. In such case, the local node generates an interrupt or other appropriate signal to indicate the bus should be resynchronized and data retransmitted. In this manner, bus synchronization is performed based on the phases of the state machines of the local and remote nodes. The bus system effectively operates as a delay lock loop (DLL) where the duration of the loop corresponds to the predetermined number of counts.

The SYNC signal may be any appropriate signal that can be reliably transmitted by the remote node over the bidirectional transmission line for reception by the local node during the interval of time when transmission by the local node has been suspended. For example, the SYNC signal can be a single pulse or a predetermined sequence of pulses. In some examples, the remote node might transmit a digital value representative of its phase count but such is not necessary. In various examples described herein, the lack of reception of a signal by the local node during the interval of time when the SYNC signal is expected is deemed to indicate a lack of synchronization. Hence, so long as a detectable signal is received by the local node on the bidirectional transmission line during that interval of time, synchronization is thereby verified.

A cyclic redundancy check (CRC) may be used both within the local node and within the remote node to detect transmission problems of control words transmitted on the bidirectional transmission line. If the phases of the local and remote state machines are out-of-sync and/or the CRC fails, an interrupt can be issued to trigger resynchronization of the bus and retransmission of data. Rather than using a dedicated bus clock, the master system clock may be used along with a power-up training cycle or learning mode to set the DLL of the bus system. Among other advantages, at least some of the exemplary serial TDM bus systems described herein provide: small or minimal pin-counts, small or minimal hardware (HW), low latency and jitter, low-power consumption and error-resiliency. The use of a "proprietary" bus rather than an "off-the-shelf" bus helps control the attach rate of the product in the marketplace. In some examples, the bus is implemented with 0.18 m (micron) complementary metal-oxide-semiconductor (CMOS) technology (or slimmer platforms) with bit rates of 4.9 MHz or higher while using one hundred gates or fewer on the receive side of the bus. In various illustrative examples described herein, the serial TDM bus is provided for use in low cost mobile devices (such as tablet computers or smartphones) to connect the audio CODEC subsystem of the device to the audio processing subsystem of the device at high bit rates (e.g. 4.9 megahertz (MHz).) In some examples, the bus has six lines or lanes: two high bandwidth audio data transmission lines from the audio processing subsystem to the CODEC subsystem; two high bandwidth audio data receive lines from the CODEC subsystem to the audio processing subsystem; a low bandwidth bidirectional SYNC/control word (CW) line; and a clock (CLK) line. The bidirectional SYNC/CW line is the bidirectional transmission line; all other lines are unidirectional. Data and control signal integrity is monitored primarily through hardware rather than software with little or no data packet framing. This is achieved, in part, by using the bidirectional SYNC/CW line to ensure in-phase operation between the state machines on opposing sides of the bus where the receiving side (e.g. the audio CODEC) periodically sends an indicator of its phase (or bit) count to the transmitting side (e.g. the audio processing subsystem) to permit detection of a lack of state machine synchronization. That is, synchronization is performed out-of-band with respect to the high bandwidth audio data.

Exemplary Hardware Environment and Procedures

FIG. 1 illustrates the exemplary architecture of a wireless computing platform processing system 100 of a mobile communication device in accordance with one example where various novel features may be exploited. System 100 includes a main processing circuit 102, which may correspond to, or form a portion of, a System-on-a-Chip (SoC) processor such as the Snapdragon™ processor manufactured by Qualcomm Incorporated. In this example, processing circuit 102 includes a 3G/4G modem 104, a WiFi component 106, a global positioning system (GPS) component 108, a Bluetooth™ (BT) wireless subsystem 110 and a connection processor 112. Processing circuit 102 is connected via an interconnects and external memory storage module 114 to various other systems, subsystems, modules and components including, in this example, a peripheral/external device subsystem 116 having a peripheral device/interfaces component 118 for use with external modules and devices 120, such as secure digital (SD) cards, universal serial bus (USB) sticks, etc. System 100 also includes a power/clock module 122 that may include temperature-compensated crystal oscillators (TCXOs), phase locked loops (PLLs), clock generators, a battery charging circuit and power manager, and a battery monitor and platform resource/power manager (not separately shown.) An application processing subsystem 130 may include a cache 131 and an application processor 133, such as an application specific integrated circuit (ASIC.) An active device/sensor module 132 may include active devices, sensors and a low-power sensor platform. A multispectral multiview image signal processor (ISP) 138 is provided for correction/optimization/enhancement of displays. ISP 138 may also include various multimedia processors and accelerators. A memory storage module 140 includes an on-chip memory storage 142, an application data mover 144 and a general-purpose computing on graphics processor unit (GPGPU) 146. A display module 148 may include a display processor controller and a display driver/touch screen controller and panel component (not separately shown.) A security subsystem 154 is also provided.

Still further, an audio processing module or system 156 is provided that includes an audio processing subsystem 158 and an audio CODEC subsystem 160, which provide connections for one or more microphones (MICS), speakers (SPKR) and a headphone interface (HPH I/F.) A headphone 164 is shown in phantom lines as it is a separate and external device. A serial TDM bus 166 interconnects audio processing subsystem 158 and audio CODEC subsystem 160.

Note that some of the components of system 100, including audio processing subsystem 158, form part of a mobile station modem (MSM), which is not separately shown. Other components of system 100, including audio CODEC subsystem 160, form part of a power management integrated circuit (PMIC), likewise not separately shown. For performance or cost reasons, CODEC subsystem 160 is thereby separate from audio-processing subsystem 158, with bus 166 provided to connect the two components. Note also that various other internal bus lines or connection lines are shown within system 100 for interconnecting the various subsystems or modules. For brevity and clarity, these other connection lines or busses among or between the various subsystems or modules are not shown. It should be understood that FIG. 1 is not intended to illustrate all components or subcomponents that may be employed within a wireless computing platform but merely to show selected features of an exemplary hardware environment.

Figure 2:
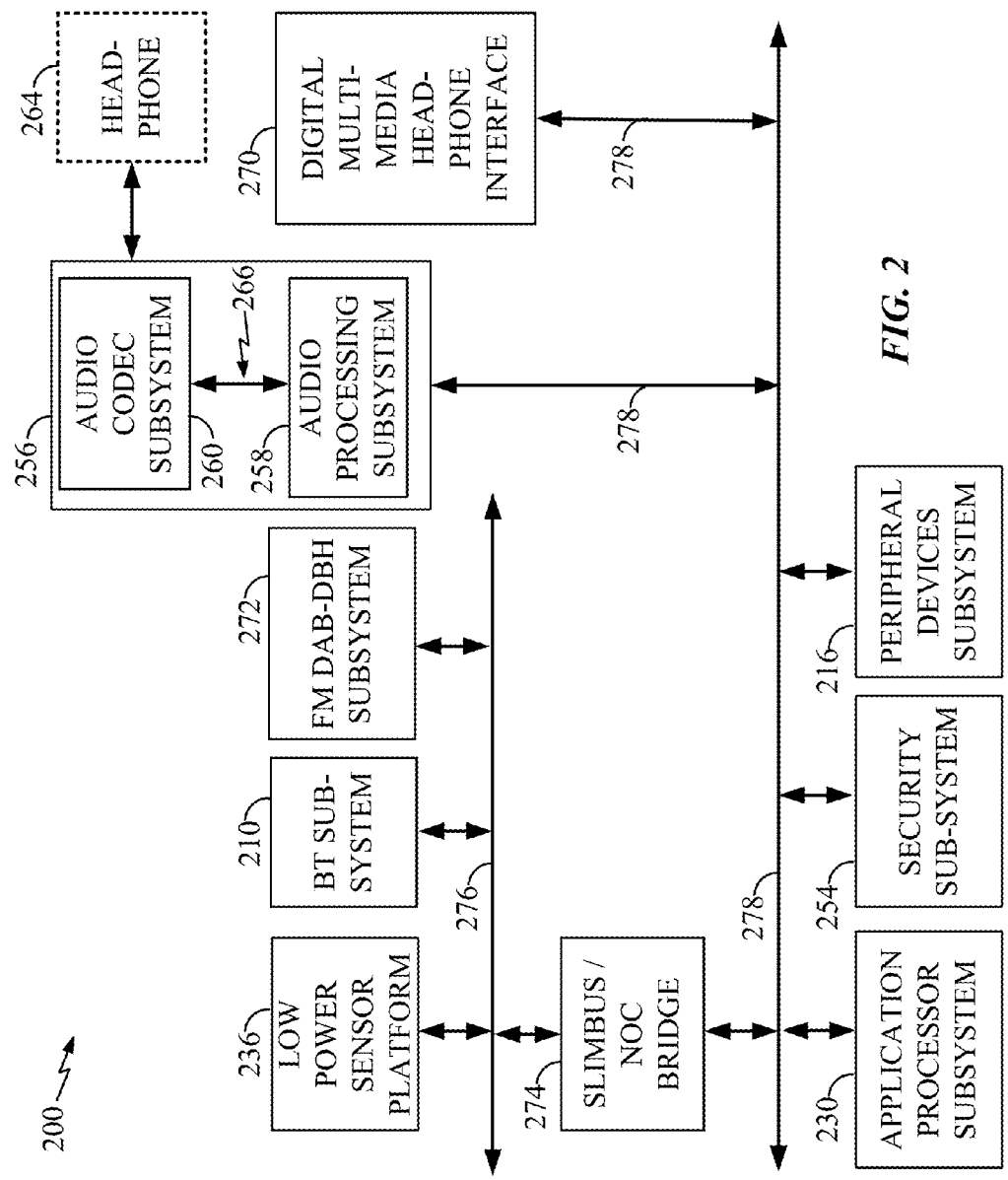
FIG. 2 illustrates an audio processing module of the exemplary processing system of FIG. 1, including an audio processing subsystem and an audio CODEC subsystem, along with selected components for use therewith.

FIG. 2 illustrates an example of a wireless computing platform processing system 200 wherein only a few selected components are shown. An audio CODEC subsystem 260 and an audio processing system 258 are again interconnected by a serial TDM bus 266. Other components shown in the figure include headphone 264 (again shown in phantom lines), low-power sensor platform 236, BT subsystem 210, security subsystem 254 and peripheral devices subsystem 216. The figure also shows a few components not shown in FIG. 2, including a digital multimedia headphone interface 270, a frequency modulated (FM) digital audio broadcast (DAB)-digital hybrid broadcast (DHB) subsystem 272 and a SLIMbus network-on-a-chip (NOC)/bridge 274, which interconnects a SLIMbus 276 and a separate NOC bus 278.

Serial TDM bus 266 may be configured as a multi-channel realtime audio interface with low or minimum pin-count and low or minimum HW. In at least some examples described herein, serial TDM audio interface bus 266 is configured to provide four channels of DAC traffic with sampling frequency (FS) of 4.8 mega-samples per second (MSPS) @ 2bits/Sample (e.g. 9.6 mega-bits per second (Mbps)); a Control-Word of 5 bits; with a Buck-Regulator and four Charge-Pump Controls of 18bits. Serial TDM bus 266 is also configured to provide four channels of ADC traffic with FS of 4.8 MSPS and 2 bits/Sample (e.g. 9.6 Mbps.) Power Consumption may be: Active (~10 mW); StandBy (less-than 1 mW) and Power-Down (~5 uW) with Link Error Detection/Notification. These are merely exemplary values.

Figure 3:
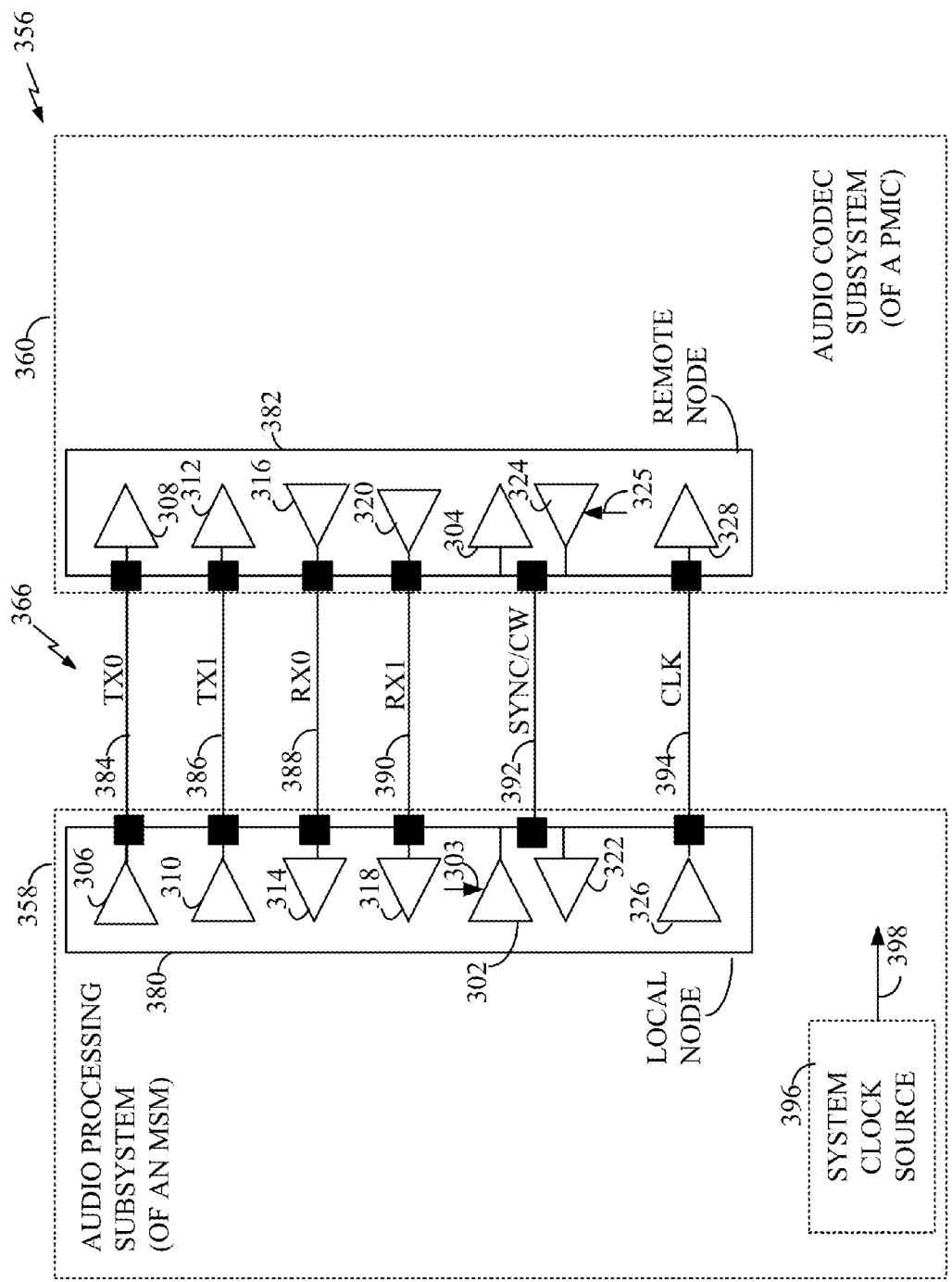
FIG. 3 illustrates an exemplary serial TDM bus for use with the audio processing module of FIG. 2.

FIG. 3 illustrates an example of an audio processing module 356, illustrating components of a serial TDM bus 366 that interconnects a local node 380 of audio processing subsystem 358 (which may form part of an MSM) and a remote node 382 of audio CODEC subsystem 360 (which may form a portion of a PMIC). Components of the TDM bus are shown in solid lines to highlight the components, whereas other components are shown in phantom lines. In this particular example, TDM bus 366 includes a pair of unidirectional "forward direction" transmit lines or lanes 384 and 386, a pair of unidirectional "reverse direction" transmit lines or lanes 388 and 390. A bidirectional SYNC/CW line or lane 392 is also provided along with a clock (CLK) line 394. Each of the six lines of the TDM bus also includes amps or other suitable devices at the input and output terminals. In particular, TX0 line 384 is connected via suitable terminals to input/output (I/O) amps 306 and 308. TX1 line 386 is connected via suitable terminals to amps 310 and 312. RX0 line 388 is connected via suitable terminals to amps 314 and 316. RX1 line 390 is connected via suitable terminals to amps 318 and 320. Bidirectional SYNC/CW line 392 is connected via suitable terminals to amps 302 and 304 for transmitting control words from the local node to the remote node. The bidirectional SYNC/CW line is also connected via the same terminals to amps 322 and 324 for transmitting the SYNC signal from the remote node to the local node. Note that amp 302 receives a control signal 303 and amp 342 receives a control signal 325. As will be explained below, the control signals are direction (DIR) control signals, which allow the "direction" of the bidirectional SYNC/CW line 392 to be selected or changed. This will be described in further detail below. In the example of FIG. 3, the clock is derived from a system CLK source 396 (e.g. 19.2 MHz) input via an input line 398. The clock signal is fed into local node 380 (via a connection line not shown) and then relayed to remote node 382 via clock (CLK) line 394, which is coupled to I/O amps 326 and 328.

In one example, TDM bus 356 provides a system-synchronous interface using a 19.2 MHz host clock (via system CLK source 396) and employs following signals: TX[1:0] to deliver audio-processor data to DACs (not shown in this particular figure) of the audio CODEC subsystem 360; RX[1:0] to deliver ADC data to the audio processing subsystem from the audio CODEC subsystem; SYNC for synchronizing serializer/de-serializer components (also not shown in this particular figure) of the local and remote nodes; CW for delivery of control signals from the audio processing subsystem to the audio CODEC subsystem; and CLK to provide the interface clock. With this configuration, local node 380 (or portions thereof) may be regarded as a state machine of the audio processing subsystem 358. Remote node 382 (or portions thereof) may be regarded as a state machine of the audio CODEC subsystem 360.

Figure 4:
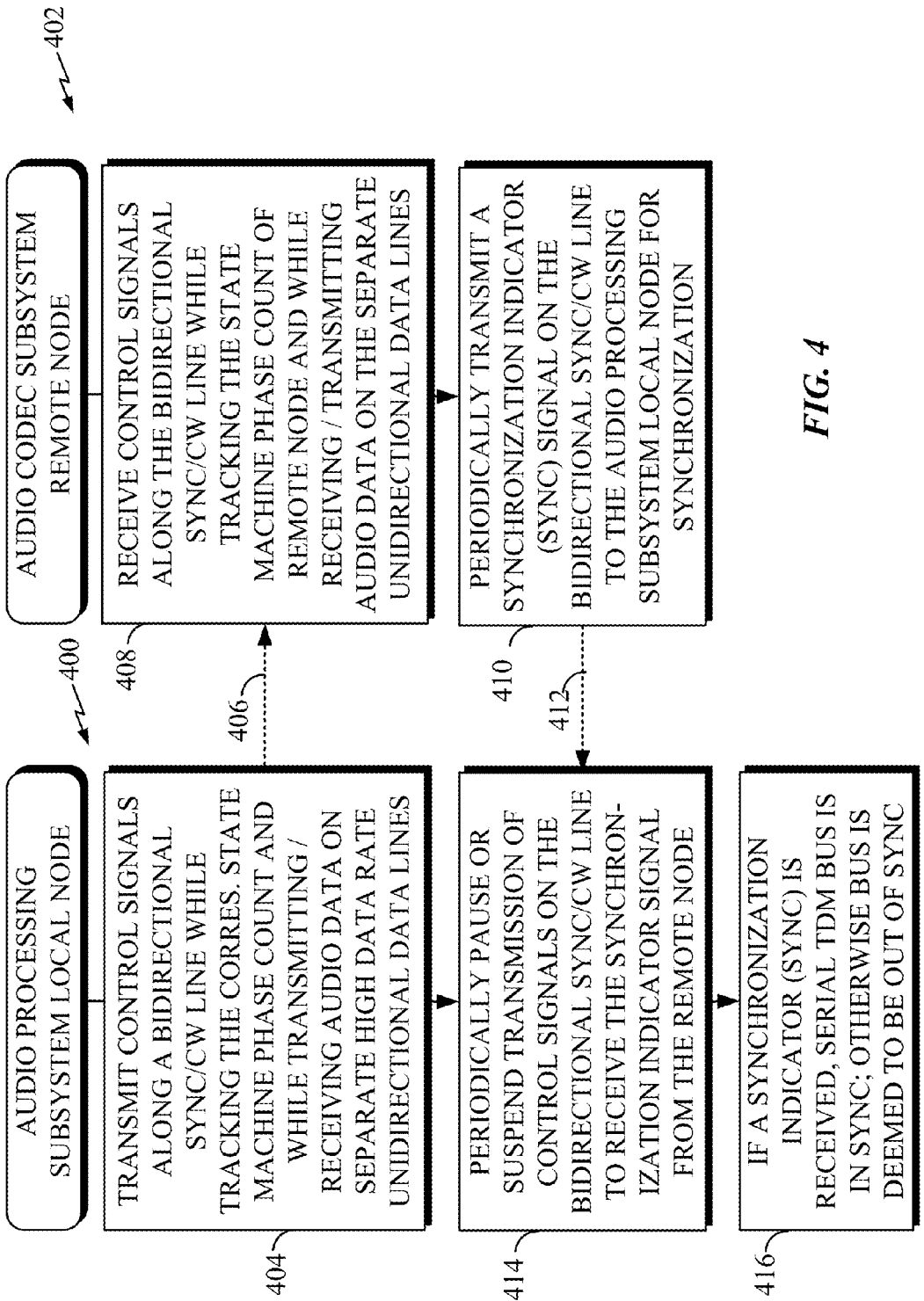
FIG. 4 provides an overview of serial TDM bus synchronization for use with the audio processing module of FIG. 2.

FIG. 4 provides an overview of the synchronization of the serial TDM bus of FIGS. 1-3, in which operations 400 performed by the audio processing subsystem local node are shown on the left and operations 402 performed by the audio CODEC subsystem remote node are shown on the right. Beginning at step 404, the local node transmits control signals (e.g. control words (CWs)) to the remote node along the aforementioned bidirectional SYNC/CW line while tracking the corresponding phase count of the local node state machine and while transmitting/receiving audio data on the various separate high data rate unidirectional data lines. The transmission of the CW signals and corresponding data to the remote node is shown via dashed line 406. Concurrently, at step 408, the remote node of the audio CODEC subsystem receives the CW control signals along the bidirectional SYNC/CW line while tracking the corresponding state machine phase count of the remote node and while receiving/transmitting audio data on the separate unidirectional data lines.

At step 410, the remote node periodically transmits a synchronization indicator (SYNC) signal on the bidirectional line to the local node to verify synchronization. For example, the remote node may transmit the SYNC signal once every 120 steps or bits (or using any other suitable number of steps N.) Concurrently, at step 414, the local node pauses or suspends its transmission of control signals on the bidirectional SYNC/CW line to receive the SYNC signal from the remote node. Hence, if the remote node is programmed to send the synchronization indicator signal every 120 phase counts, the local node will likewise be programmed to pause transmission of control signals every 120 phase counts. Assuming the local and remote state machines are in synchronization, the local node will receive the SYNC signal while its control signal transmissions are paused and synchronization will thereby be verified. Otherwise, the local node will not receive the SYNC signal while its control signal transmissions are paused and synchronization will thereby not be verified. This is shown by way of step 416, which indicates that if the synchronization indicator is received, the TDM bus is in sync;

otherwise the bus is deemed to be out of sync. Although not shown in FIG. 4, assuming the bus is found to be in sync, the local node then resumes transmission of control signals to the remote node over the bidirectional SYNC/CW line. Otherwise, an error interrupt is generated to trigger the system in which the bus resides to resynchronize the bus and retransmit data.

Figure 5:
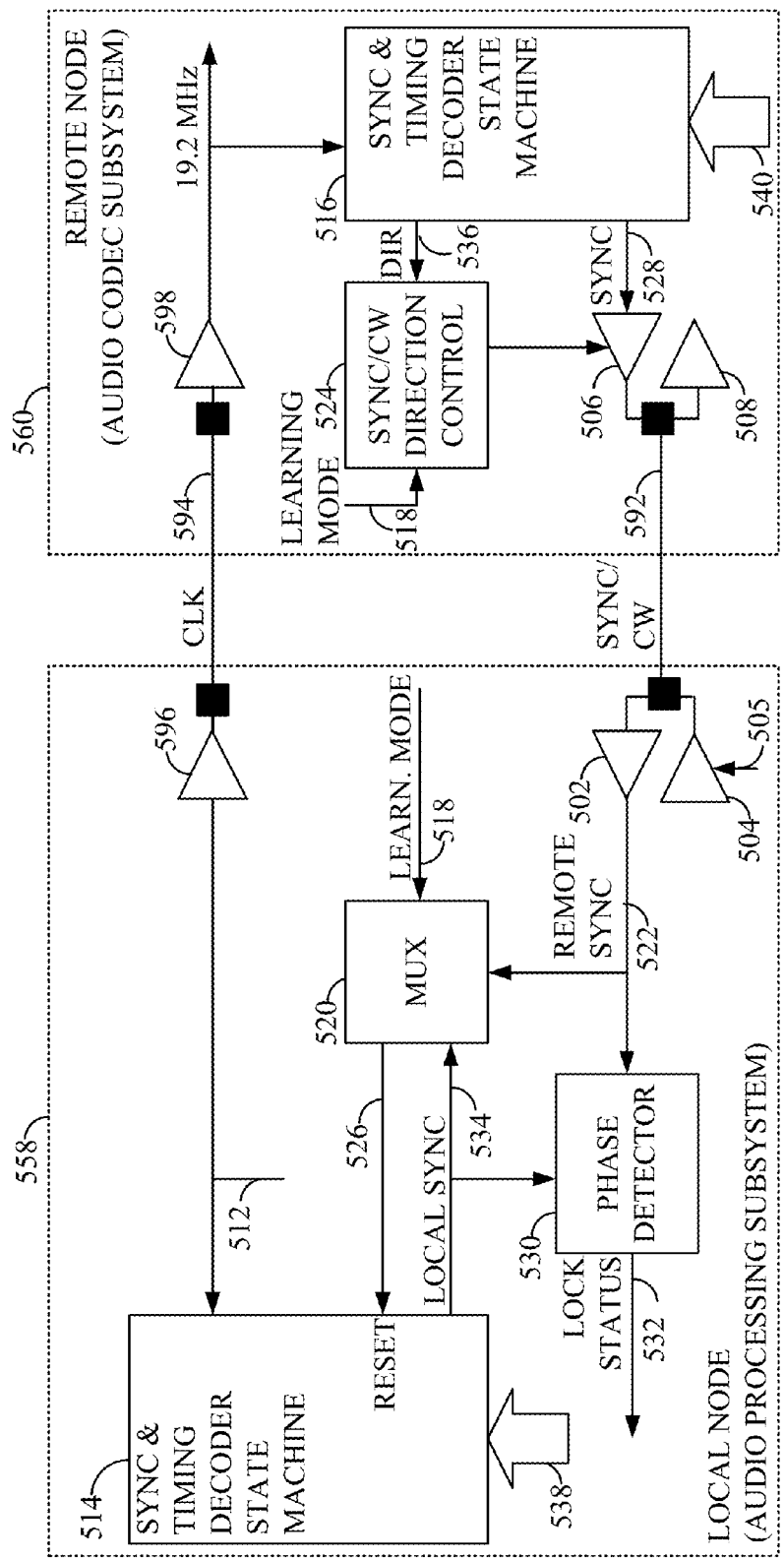
FIG. 5 illustrates exemplary synchronization components of the audio processing module of FIG. 2.

FIG. 5 illustrates selected components of the local node (e.g. the audio processing subsystem) 558 and the remote node (e.g. the audio CODEC subsystem) 560, particularly components for use in controlling synchronization and for providing an initial learning mode. In the example of FIG. 5, amps 502 and 504 are connected to the local node end of the bidirectional SYNC/CW line; whereas amps 506 and 508 are connected to the remote node end of the bidirectional SYNC/CW line. The figure also illustrates a clock (CLK) line 594 and its corresponding transmit and receive amps 596 and 598. The clock signal is initially received along input line 512 and may be a 19.2 MHz signal. The clock (CLK) signal is fed into a synchronization and timing decoder 514 of the local node and into a corresponding synchronization and timing decoder 516 of the remote node. The synchronization and timing decoder 514 of the local node counts or tracks the state machine phases of the local node (wherein the state machine may correspond to the various states of the hardware of synchronization and timing decoder 514.) The synchronization and timing decoder 516 of the local node counts or tracks the state machine phases of the remote node (wherein the state machine may correspond to the various states of the hardware of synchronization and timing decoder 516.) In this regard, as CW data is transmitted along the bidirectional SYNC/CW line 592 from the local node to the remote node, the states of synchronization and timing decoder 514 and synchronization and timing decoder 516 change.

When the phase count of the remote node reaches a predetermined value (e.g. 120 counts), synchronization and timing decoder 516 sends a direction (DIR) signal to a SYNC/CW direction controller 524, which forwards a suitable control signal to amp 506 to transmit a SYNC signal 528 along bidirectional SYNC/CW line 592. The SYNC signal is received by amp 502 of the local node as a REMOTE_SYNC signal 522, which is fed into a phase detector 530. Concurrently, synchronization and timing decoder 514 of the local node tracks its phase count and, when the phase count of the local node reaches the same predetermined value, synchronization and timing decoder 514 sends a LOCAL_SYNC signal along line 534 to the phase detector. Assuming phase detector 530 receives the LOCAL_SYNC signal during the same interval (e.g. clock cycle) that it receives the REMOTE_SYNC signal, the local and remote nodes are deemed to be in sync. A LOCK status signal 532 is output to indicate whether the nodes are in sync. The LOCK signal is routed to higher-level components (not shown in FIG. 5) that reset the TDM bus if the nodes are not in sync.

During interval while the SYNC signal is not sent from the remote node to the local node, CW signals are sent along bidirectional SYNC/CW line 592 via amps 504 and 508 for processing other components of the remote node. In this regard, amp 504 receives a DIR signal 505 (from control components not shown), which is similar to the DIR signal received by amp 506 of the remote node but is the reverse thereof. That is, when the DIR signal of the remote node indicates that the remote node should transmit its SYNC signal, the DIR signal of the local node is in the opposite state so no CW signals are transmitted at the same time. Still further, note that both of the synchronization and timing decoders (of the local and remote nodes) may receive additional signals for processing along input lines 538 and 540, respectively, from other components, not shown.

Figure 6:
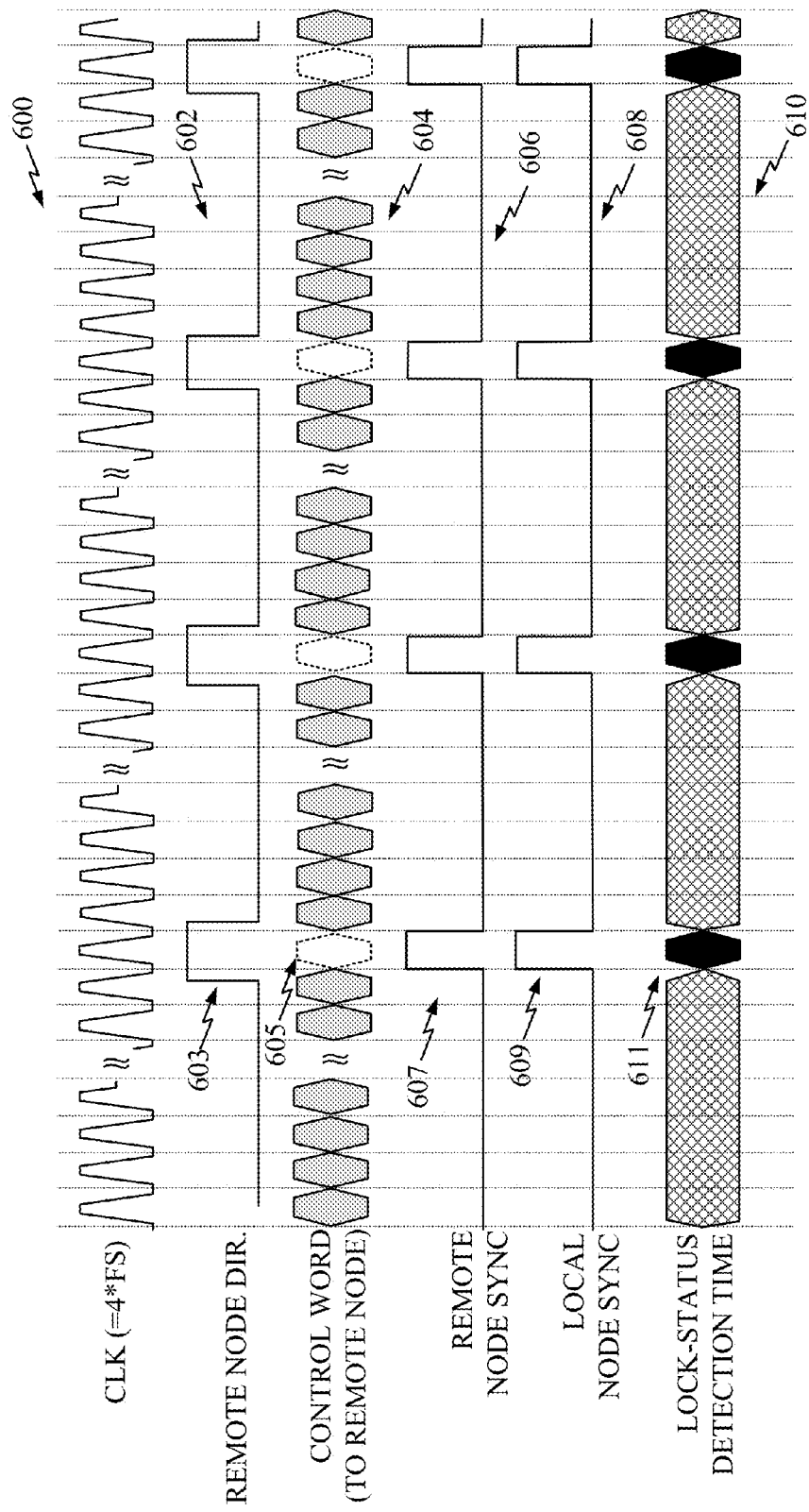
FIG. 6 illustrates exemplary timing signals for use with the audio processing module of FIG. 2.

FIG. 6 illustrates exemplary synchronization timing signals that may be generated and processed by the components of FIG. 5. A clock signal 600 is shown, with breaks to indicate that the signals are truncated to permit other pertinent signals to be conveniently illustrated in the figure. A remote node direction (DIR) signal 602 is shown, which is set ON 603 for at least one clock cycle every N cycles or phase counts of the remote node (where N is, e.g., 120 or by using other appropriate predetermined intervals of time) to accommodate reversal of the direction of the bidirectional bus line. Control-word signals 604 can be transmitted from the local node to the remote node at any time other than during clock cycle 605 during which the direction of the bus lines is switched. In one example, the clock cycles of the control word are CW0, CW1, CW3 and CW4, etc., which are then repeated following clock cycle 605. During clock cycle 605, the aforementioned REMOTE_SYNC signal 606 is set ON 607 for one clock cycle. Concurrently, assuming the local and remote nodes are in sync, the LOCAL_SYNC signal 608 is also set ON 609 for one clock cycle. Assuming both the REMOTE_SYNC and LOCAL_SYNC signals are ON during the interval of time when the REMOTE node DIR signal is also ON 603, proper synchronization or phase lock is thereby detected (by the phase detector of the local node) and a LOCK status detection time signal 610 is set at 611 to indicate that a proper lock has been detected. Otherwise, the lock status would indicate no lock and the bus would need to be reset.

Returning briefly to FIG. 5, during an initial learning mode or training cycle (which can last as little as about fifty clock-cycles), a learning mode signal 518 is applied to both the local and remote nodes (from a higher-level controller not shown.) In the local node, the learning mode signal is applied to control a multiplexer (MUX) 520, which also receives REMOTE_SYNC signals from the bidirectional SYNC/CW line 592 via an internal line 522 and LOCAL_SYNC signals along line 534. The output of the MUX is applied to a RESET input of synchronization and timing decoder 514 to selectively reset the decoder. In the remote node, the learning mode signal is applied to SYNC/CW direction control component 524, which controls remote node amp 506. In one example, upon initiation of the learning mode, SYNC/CW direction controller 524 of the remote node controls amp 506 to send one or more SYNC signals 528 generated by synchronization and timing decoder 516 of the remote node along bidirectional SYNC/CW line 592 to the local node, which receives the signals as REMOTE_SYNC signals. The effect of the operation of MUX 520 is to eventually cause synchronization and timing decoder 514 to be reset when both REMOTE_SYNC and LOCAL_SYNC are active. In this manner, synchronization and timing decoder 514 is "trained" to be in sync initially with synchronization and timing decoder 516, at which time the learning mode is complete. Thereafter, data is transmitted and control words are sent over the TDM bus while the phase detector 532 of the local node continues to monitor the LOCAL_SYNC and REMOTE_SYNC signals to verify that the nodes remain synchronized. Hence, the local and remote nodes of the serial TDM bus system effectively function as a DLL that employs a training cycle or learning mode to set the DLL before transmission of data.

Figure 7:
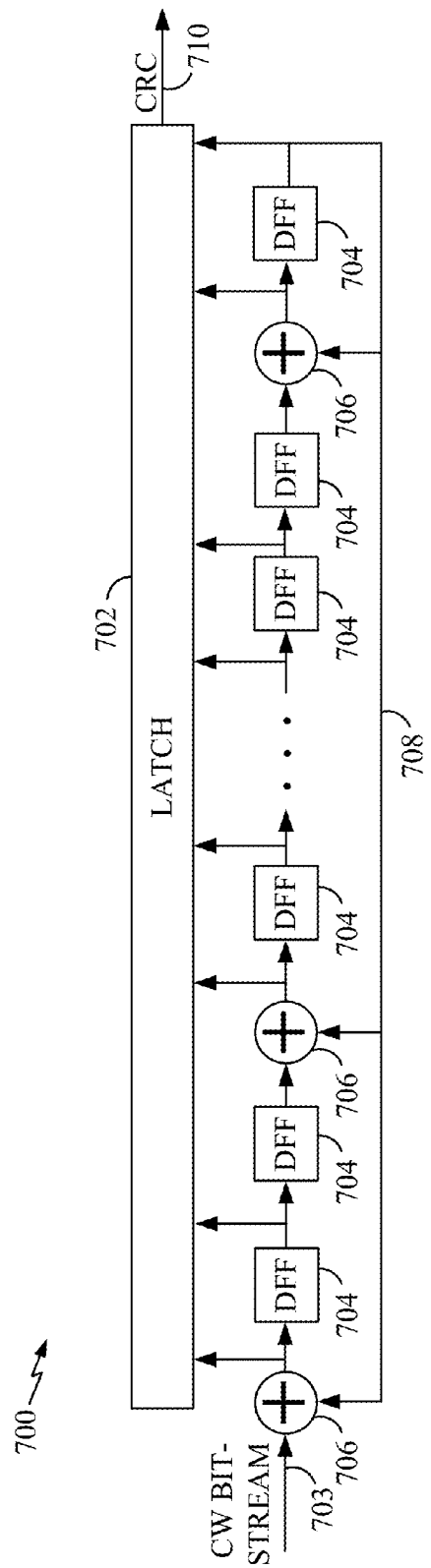
FIG. 7 illustrates an exemplary cycle redundancy check (CRC) device for use with the audio processing module of FIG. 2.

FIG. 7 illustrates a CRC calculator 700 that may be incorporated into the local and remote nodes to detect possible problems with the control words transmitted by the local node. CRC component 700 includes a latch 702 along the incoming control word (CW) bit stream line 703, along with a set of D-flip flops (DFFs) 704 and XOR devices 706, arranged as shown. An input CW bit stream received along line 703 is routed through the DFFs and then routed back along feedback line 708 for XORing with newly incoming bit streams using XOR devices 706. The results are held in latch 702, with the output 710 of the latch providing the CRC for the CW bitstream.

Figure 8:
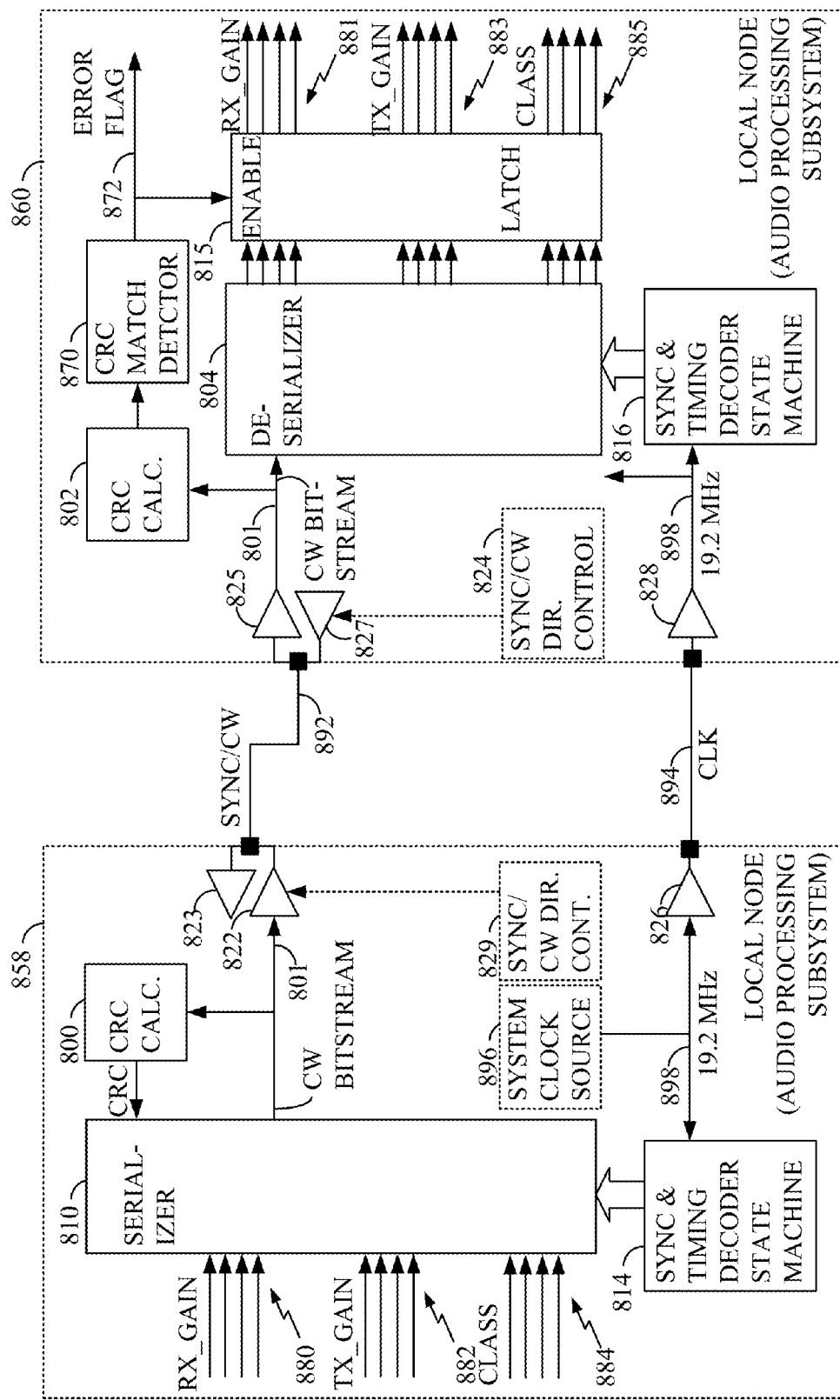
FIG. 8 illustrates the exemplary CRC components of FIG. 7 for use within an audio processing module.

FIG. 8 shows exemplary CRC calculators 800 and 802 incorporated within local node 858 and remote node 860. Some of the components of FIG. 8 are shown in solid lines and others in phantom lines so as to emphasize certain features. In this example, a CW bitstream 801 is transferred from the local node to the remote node along bidirectional SYNC/CW line 892 where it is received via amp 825 (or other suitable input device) and routed into CRC calculator 802 (which may be configured as in FIG. 7.) The output CRC value is fed into a CRC match-detector 870, which determines if the CRC value is indicative of an error in the CW bitstream. If a CRC error has occurred, an error_flag 872 is set ON, which may be used by other control components (not shown) to trigger resynchronization of the bus and retransmission of data. As already explained, the line 892 is bidirectional and its direction is controlled on the remote node side by SYNC/CW directional controller 824, which controls an amp (or other suitable device) 827 to transmit the SYNC signal along line 892 to the local node. The SYNC signal is received by amp 823 for processing by other components (not shown in this figure.)

In the example of FIG. 8, the local node also includes a SYNC/CW direction control component 829, which controls output amp 822 connected to bidirectional SYNC/CW line 892. Still further, the local node includes its own CRC calculator 800, which receives CW bitstream 801 from serializer 810 for performing a CRC check. The output of CRC calculator 800 is fed directly into the serializer 810 so the serializer can address any CRC errors. Note that serializer 810 also receives parallel sets of RX data 880 and TX data 882 from other components, as well as class data 884 (e.g. Class_H0, Class_H1), from which the serializer generates the CW bitstream. In one example: the four RX_GAIN lines correspond to RX_Gain0, RX_Gain1, RX_Gain2 and RX_Gain3; the four TX_GAIN lines correspond to TX_Gain0, TX_Gain1, TX_Gain2 and TX_Gain3; and the four Class control lines correspond to Class_H0, Class_H1, Class_H2, and Class_H3. Deserializer 804 of the remote node deserializes the incoming CW bitstream for latching in latch 815, which is enabled by the output of CRC match detector 870, as shown, then the data is output as various RX, TX, and Class data signals, 881, 883 and 885, as shown. Other components shown in FIG. 8 include synchronization and timing decoder 814 of the local node and its corresponding component 816 of the remote node. The system clock source 896, which provides clock signal 898, is also shown along with clock (CLK) line 894 with amps 826 and 828 at its opposing ends.

Figure 9:
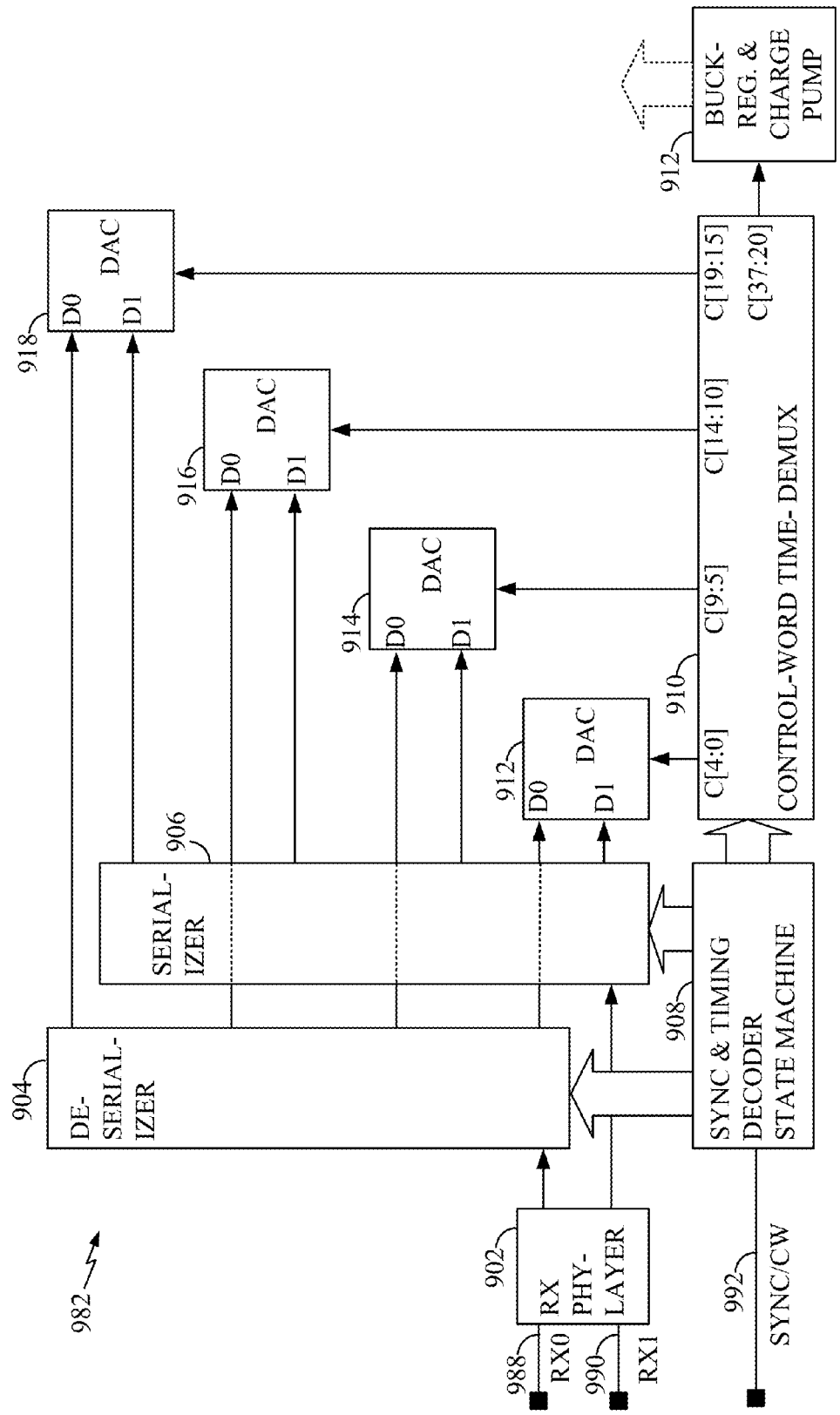
FIG. 9 illustrates exemplary de-serializer components and digital-to-analog (DAC) components for use within the audio CODEC subsystem of FIG. 2.

FIG. 9 illustrates selected components 982 of the remote node (e.g. the audio CODEC subsystem) directed to de-serializing and processing digital audio data payloads and control signals received from the local node (e.g. the audio processing subsystem.) Incoming digital data is received in serial form along unidirectional bus lines RX0 and RX1, 988 and 990, by an RX physical (PHY) layer component 902 that forwards the data to de-serializers 904 and 906. Concurrently, control signals are received along bidirectional SYNC/CW line 992 by synchronization and timing decoder 908, which forwards control signals to the two de-serializers as well as to a control-word time-demultiplexer (DEMUX) 910. De-serialized digital data from de-serializers 904 and 906 is routed to a set of four DACs (912, 914, 916 and 918), which convert the digital data to analog signals for routing (along output lines not shown) to devices such as an external headphone. Note that the DACs also receive portions of the control-word signals as control input as shown. A BUCK-regulator and charge pump component 912 is also shown, which also receives a portion of the control-word signals, as indicated. Component 912 may be employed, for example, to step-up or step-down voltages received from a power source of the bus (along lines not shown) for output to other components as shown by way of a phantom arrow.

Figure 10:
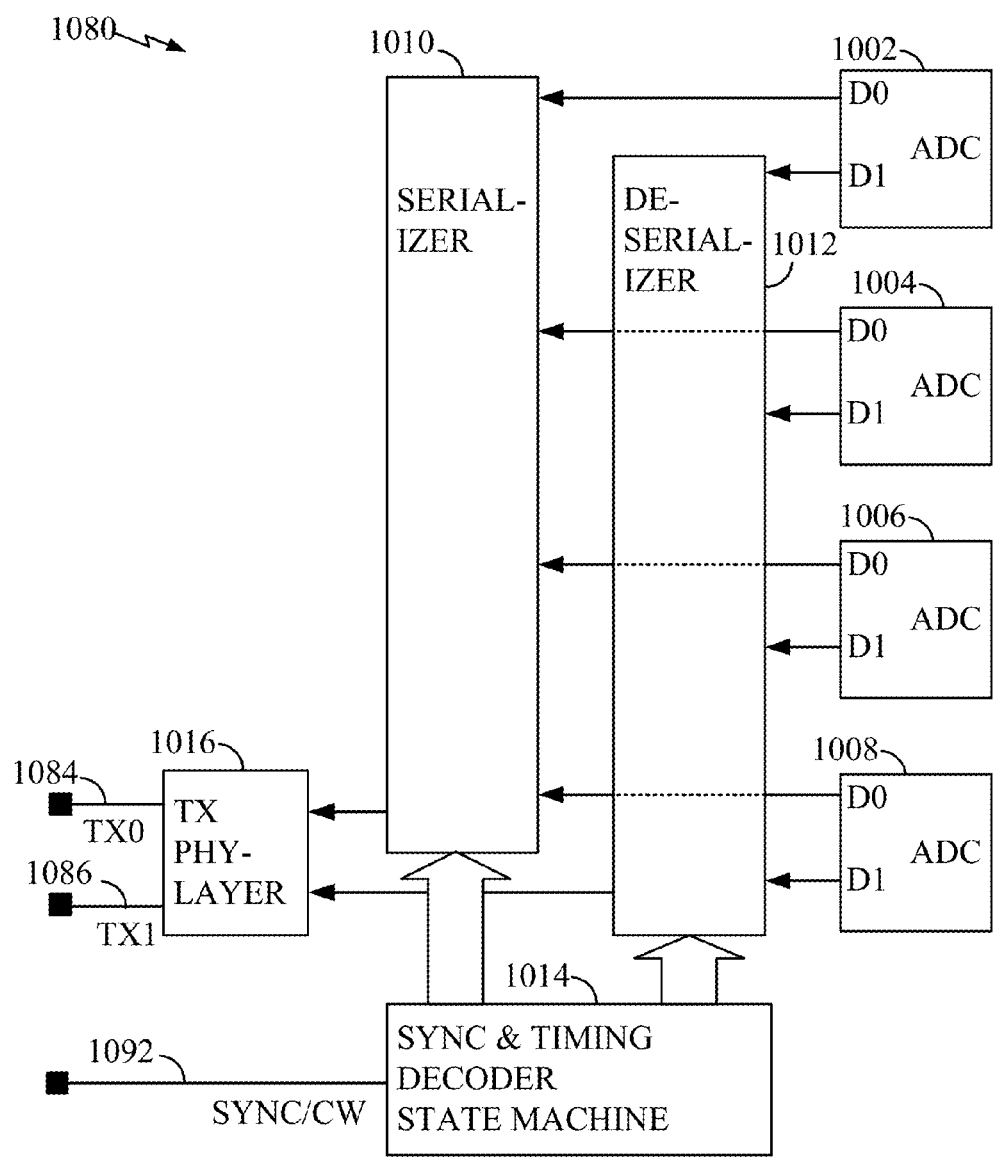
FIG. 10 illustrates exemplary serializer components and analog-to-digital (ADC) components for use within the audio processing subsystem of FIG. 2.

FIG. 10 illustrates selected components 1080 of the local node (e.g. the audio processing subsystem) directed to converting input analog signals into digital payloads for transmitting to the remote node (e.g. the audio CODEC subsystem) as serialized data. Incoming analog data is received from input lines (not shown) via a set of ADCs 1002, 1004, 1006 and 1008 for routing into a pair of serializers 1010 and 1012. The serializers operate under the control of a synchronization and timing decoder 1014, which provides control signals to the serializers and also provides control words for transmission on bidirectional SYNC/CW line 1092. Serialized data is routed from the serializers into a transmit TX PHY-layer component 1016 for transmission along TX0 and TX1 lines 1084 and 1086, respectively, to the remote node.

Exemplary Apparatus, Systems and Methods

Figure 11:
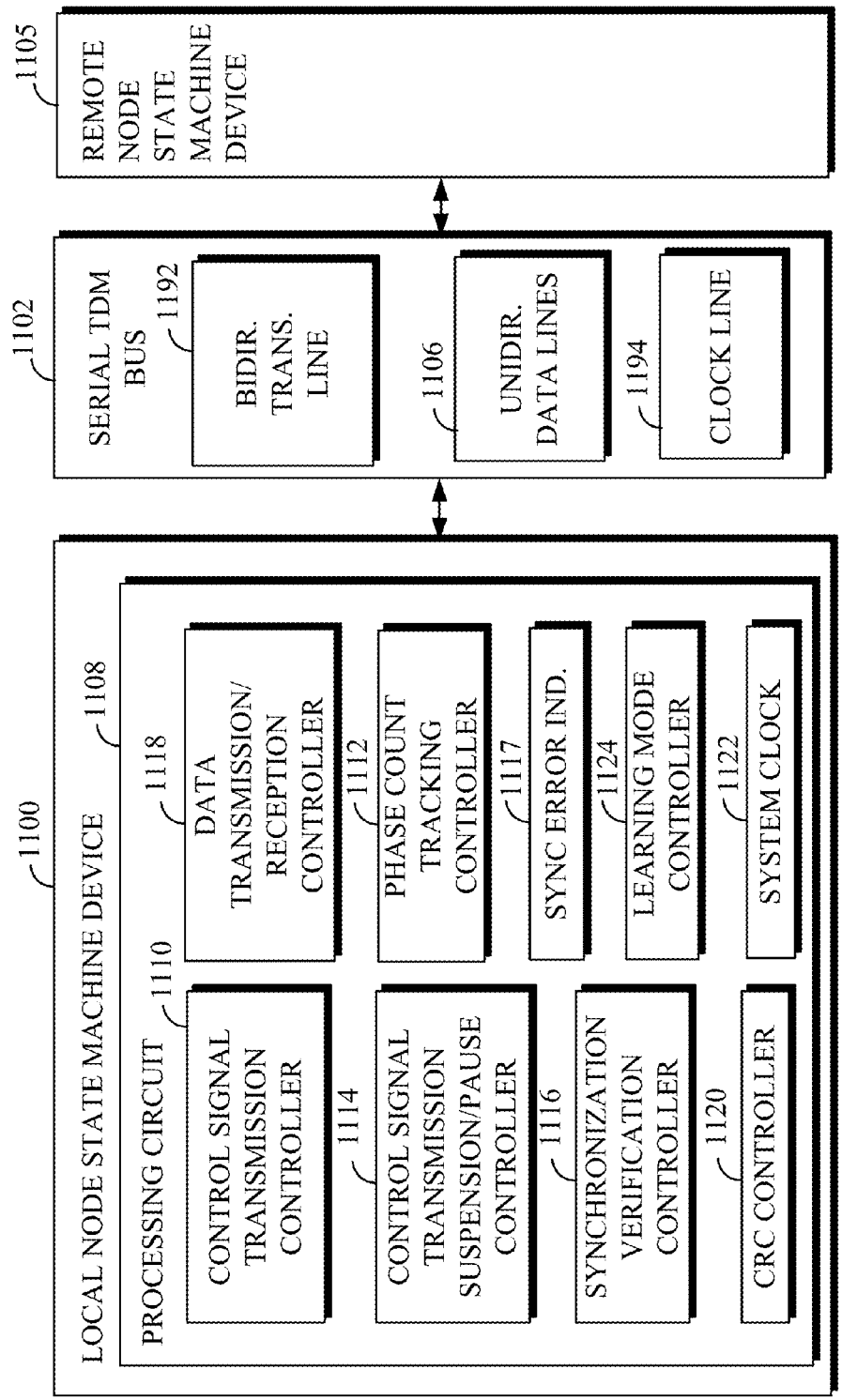
FIG. 11 illustrates an exemplary local node state machine device for use in TDM bus synchronization wherein the local node may be an audio processing subsystem.

FIG. 11 illustrates an exemplary local node state machine apparatus or device 1100 connected via a serial TDM bus 1102 to a remote node state machine device 1105. The bus has at least one bidirectional transmission line 1192, one or more unidirectional data lines 1106 and a clock line 1194. Bidirectional transmission line 1192 is a relatively low transmission rate/low bandwidth line compared to unidirectional lines 1106, which are relatively high transmission rate/high bandwidth lines. Local node state machine device 1100 includes a processing circuit 1108 configured to control or perform various functions or processes. In this example, processing circuit 1108 includes a control signal transmission controller 1110 configured to control the transmission of control signals along bidirectional transmission line 1192 to remote node device 1105. A phase count tracking controller 1112 is configured to track a phase count as the control signals are transmitted to the remote device along the bidirectional transmission line. A control signal transmission suspension/pause controller 1114 is configured to temporarily pause or suspend the transmission of the control signals based on the phase count to receive a synchronization indicator signal from the remote device along the bidirectional transmission line. A synchronization verification controller 1116 is configured to verify synchronization with the remote device based on reception of a synchronization indicator signal from the remote device while transmission is temporarily suspended. The synchronization verification controller 1116 is further configured to: detect that the local and remote devices are synchronized if a synchronization indicator signal is received by the local device while transmission is temporarily suspended; and detect that the local and remote devices are not synchronized if a synchronization indicator signal is not received by the local device while transmission is temporarily suspended.

Still further, in this example, processing circuit 1108 of local node 1100 includes a synchronization error indicator component 1117 configured to generate or otherwise produce a synchronization error indicator upon detection of a lack of synchronization by the synchronization verification controller 1116. A data transmission/reception controller 1118 is configured to control transmission of data signals to the remote device along unidirectional data transmission line(s) 1106 of the bus concurrently with the transmission of the control signals along the bidirectional transmission line 1192. A CRC controller 1120 is configured to control or perform a CRC on control words to be transmitted over the bidirectional transmission line to detect whether there is a data transmission problem with the control words and, upon detection of a data transmission problem with the control words, to generate or otherwise produce a CRC error indicator. A system clock input 1122 is configured to obtain a system clock signal, which may be transmitted to the remote node device along clock line 1194. (Herein, "obtaining" broadly covers, e.g., generating, acquiring, receiving, retrieving or performing any other suitable corresponding actions.) A learning mode controller 1124 is configured to perform or control a training cycle or learning mode to initially synchronize the local node with the remote node before transmission of data signals, i.e. to set DLL components associated with the local node before transmission of data over the bus.

Figure 12:
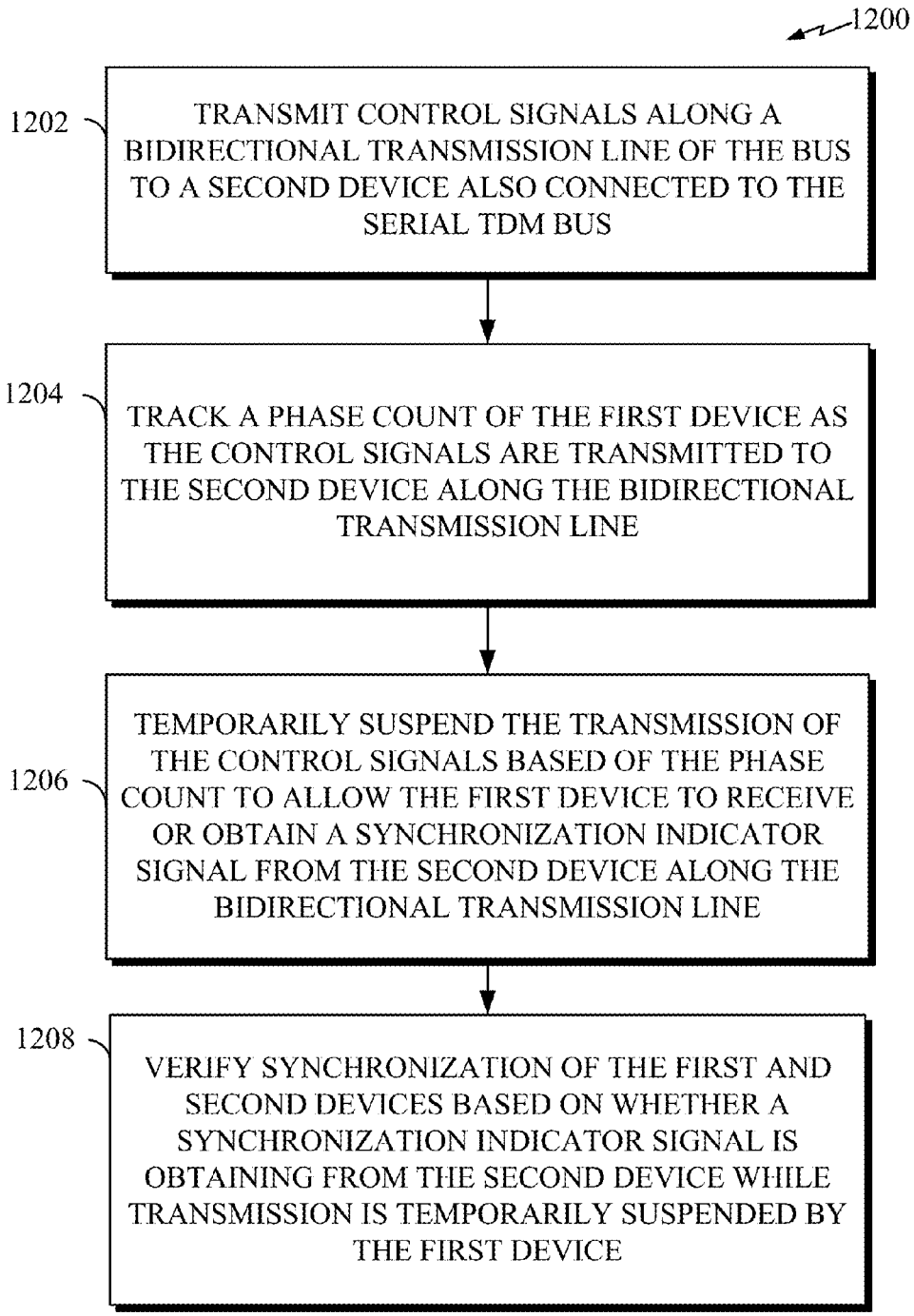
FIG. 12 illustrates procedures operable by the local node state machine device of FIG. 11.

FIG. 12 illustrates methods or procedures 1200 that may be performed by the first (local node) device of FIG. 11 or other suitably equipped devices for use with a serial TDM bus. At step 1202, the local node (first) device transmits control signals along a bidirectional transmission line of the bus to a remote node (second) device also connected to the serial TDM bus. At step 1204, the local node (first) device tracks a phase count of the local node (first) device as the control signals are transmitted to the remote node (second) device along the bidirectional transmission line. At step 1206, the local node (first) device temporarily suspends the transmission of the control signals based on the phase count to allow the local node (first) device to receive or obtain a synchronization indicator signal from the remote node (second) device along the bidirectional transmission line. At step 1208, local node (first) device verifies synchronization of the local node (first) and remote node (second) devices based on whether a synchronization indicator signal is obtained from the remote node (second) device while transmission is temporarily suspended by the local node (first) device.

Figure 13:
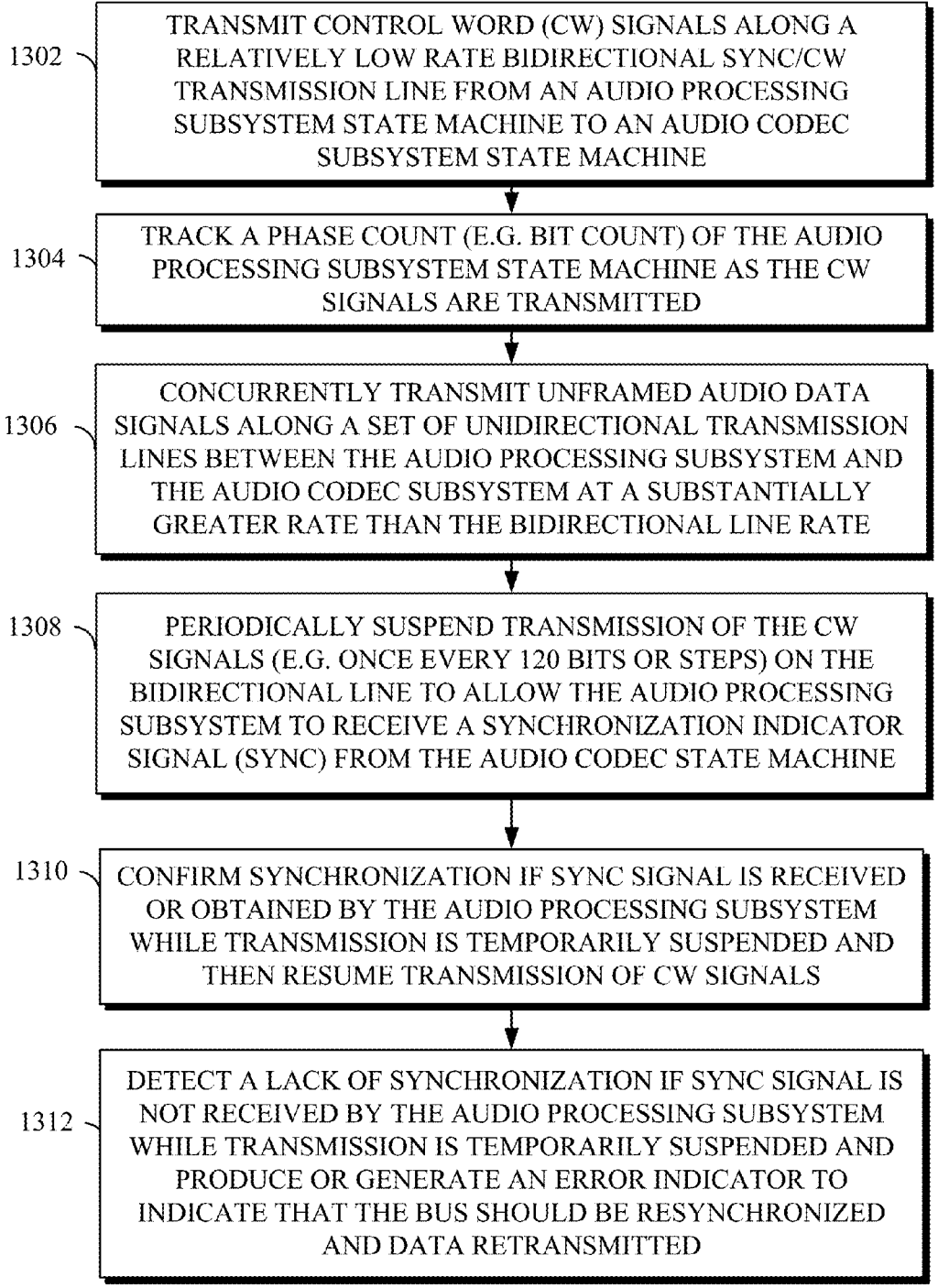
FIG. 13 further illustrates procedures operable by the local node state machine device of FIG. 11.

FIG. 13 illustrates methods or procedures 1300 that may be performed by a system wherein the first (local node) device is an audio processing subsystem (or other suitably equipped device) connected to a serial TDM bus. In this example, the second (remote node) device is an audio CODEC subsystem (or other suitably equipped device). Both the audio processing subsystem and the audio CODEC subsystem include respective state machines. At step 1302, the audio processing subsystem transmits control word (CW) signals along a relatively low rate bidirectional SYNC/CW transmission line of the TDM bus from the audio processing subsystem state machine to the audio CODEC subsystem state machine. At step 1302, the audio processing subsystem tracks a phase count (e.g. a bit count) of the audio processing subsystem state machine as the CW signals are transmitted. At step 1306, the audio processing subsystem concurrently transmits unframed audio data signals along a set of unidirectional transmission lines of the TDM bus between the audio processing subsystem and the audio CODEC subsystem at a substantially greater rate than the bidirectional SYNC/CW line rate. At step 1308, the audio processing subsystem periodically suspends or pauses the transmission of the CW signals (e.g. once every 120 bits or steps) on the bidirectional SYNC/CW line to allow the audio processing subsystem to receive a synchronization indicator signal (e.g. SYNC) from the audio codec state machine. At step 1310, the audio processing subsystem confirms synchronization if the synchronization indicator signal (SYNC) signal is received or otherwise obtained by the audio processing subsystem while transmission is temporarily suspended and then resumes transmission of CW signals. At step 1312, the audio processing subsystem instead detects a lack of synchronization if the synchronization indicator signal (SYNC) signal is not received by the audio processing subsystem while transmission is temporarily suspended and, in that case, the audio processing subsystem produces or generates an error indicator to indicate that the bus should be resynchronized and data retransmitted.

Figure 14:
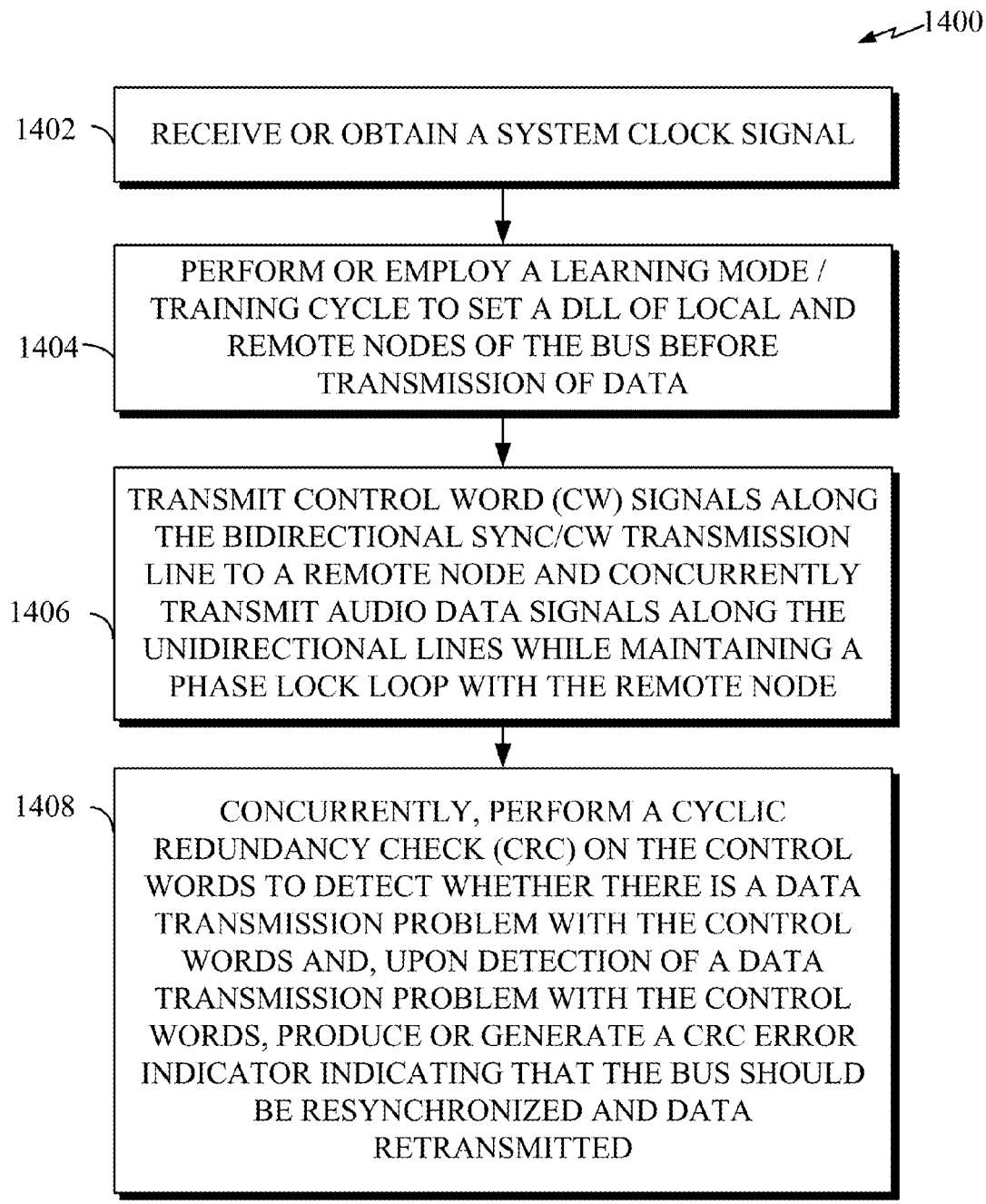
FIG. 14 illustrates additional procedures operable by the local node state machine device of FIG. 11.

FIG. 14 illustrates additional methods or procedures 1400 that may be performed by an audio processing subsystem (or other suitably equipped device) connected to a serial TDM bus. At step 1402, the audio processing subsystem (e.g. local node) receives or obtains a system clock signal for transmitting over the TDM bus. At step 1404, the audio processing subsystem performs or employs a learning mode/training cycle to initially synchronize the local and remote nodes by setting a DLL associated with the local and remote nodes before transmission of data. At step 1406, the audio processing subsystem then transmits CW signals along the bidirectional SYNC/CW transmission line to the remote node and concurrently transmits audio data signals along the unidirectional lines while maintaining a phase lock loop with the remote node. At step 1408, the audio processing subsystem concurrently performs a cyclic redundancy check (CRC) on the control words to detect whether there is a data transmission problem with the control words and, upon detection of a data transmission problem with the control words, the audio processing subsystems produces or generate a CRC error indicator indicating that the bus should be resynchronized and data retransmitted.

Figure 15:
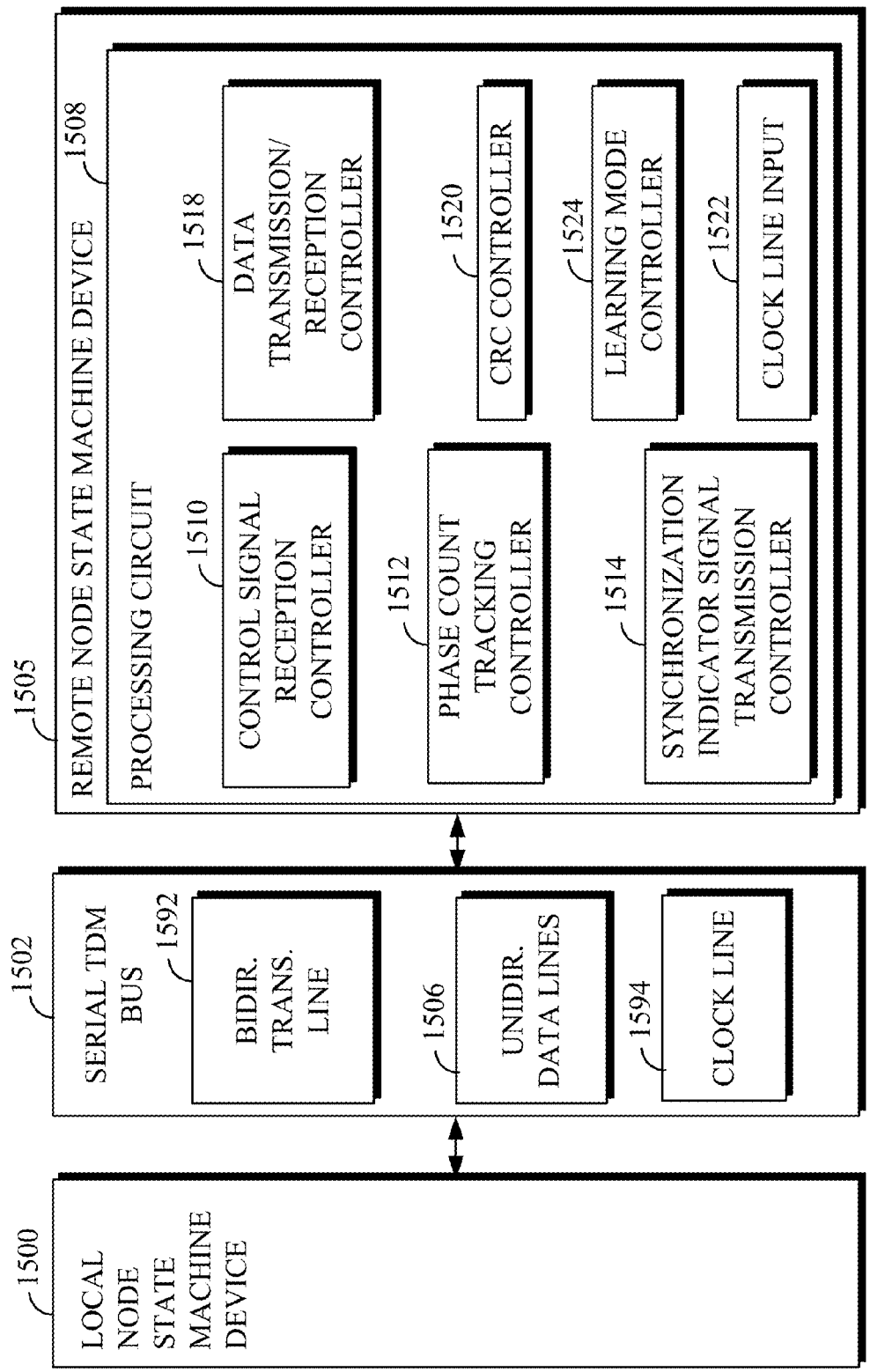
FIG. 15 illustrates an exemplary remote node state machine device for use in TDM bus synchronization wherein the remote node may be an audio CODEC subsystem.

FIG. 15 illustrates an exemplary remote node state machine apparatus or device 1505 connected via a TDM bus 1502 to a local node state machine device 1500. As in the preceding examples, the bus has at least one bidirectional transmission line 1592, one or more unidirectional data lines 1506 and a clock line 1594. The remote node state machine device 1505 includes a processing circuit 1508 configured to control or perform various functions or processes. In this example, processing circuit 1508 includes a control signal reception controller 1510 configured to control the reception (or the obtaining) of control signals along bidirectional transmission line 1592 from local node device 1500. A phase count tracking controller 1512 is configured to track a phase count as the control signals are received from the remote device on the bidirectional transmission line. A synchronization indicator signal transmission controller 1514 is configured to transmit a synchronization indicator signal (SYNC) to the remote node along the bidirectional transmission line at a time determined based on the phase count. As already explained, the local node uses the SYNC signal to verify synchronization and trigger resynchronization and retransmission of data if a lack of synchronization is detected.

Still further, in this example, processing circuit 1508 of remote node 1505 includes a data transmission/reception controller 1518 configured to control transmission of data signals to the remote device along at least some of the unidirectional data transmission line(s) 1506 of the bus concurrently with the reception of control signals along the bidirectional transmission line 1592. A CRC controller 1520 is configured to control or perform a CRC on control words received over the bidirectional transmission line to detect whether there is a data transmission problem with the control words and, upon detection of a data transmission problem with the control words, to generate or otherwise produce a CRC error indicator. A clock line input 1522 is configured to receive a system clock signal over clock line 1594. A learning mode controller 1524 is configured to perform or control a training cycle or learning mode to initially synchronize the remote node with the local node before reception/transmission of data signals.

Figure 16:
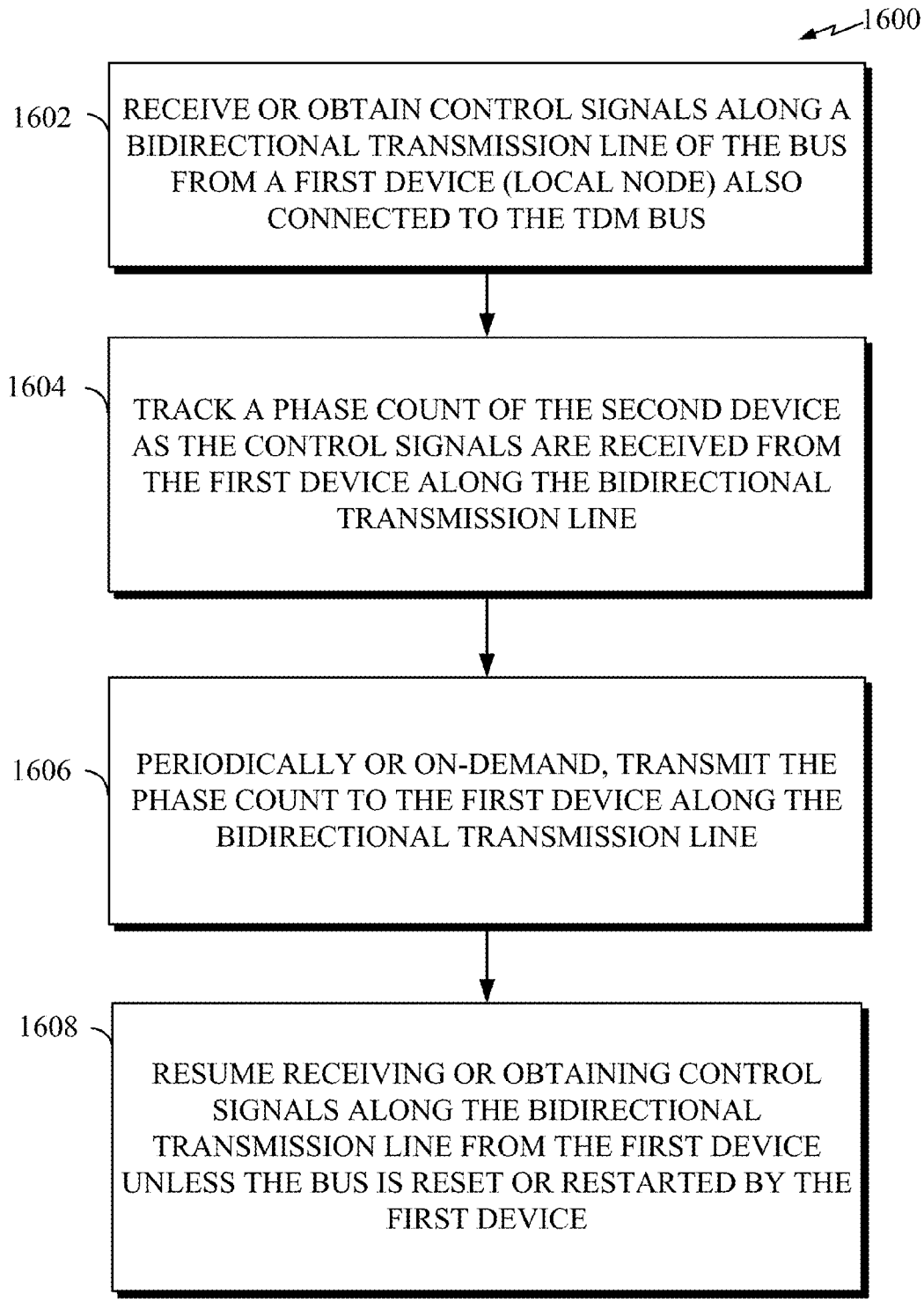
FIG. 16 illustrates procedures operable by the remote node state machine device of FIG. 15.

FIG. 16 illustrates methods or procedures 1600 that may be performed by the second (remote node) device of FIG. 15 or other suitably equipped devices for use with a serial TDM bus. At step 1602, the remote node (second) device receives (or otherwise obtains) control signals along a bidirectional transmission line of the bus from the local node (first) device also connected to the bus. At step 1604, the remote node (second) device tracks a phase count of the remote node (second) device as the control signals are received from the local node (first) device along the bidirectional transmission line. At step 1606, the remote node (second) device, periodically or on-demand (or subject to device programming), transmits the phase count to the local node (first) device along the bidirectional transmission line. At step 1608, the remote node (second) device resumes receiving or otherwise obtaining control signals along the bidirectional transmission line from local node (first) device unless the bus is reset or restarted by the first device.

Figure 17:
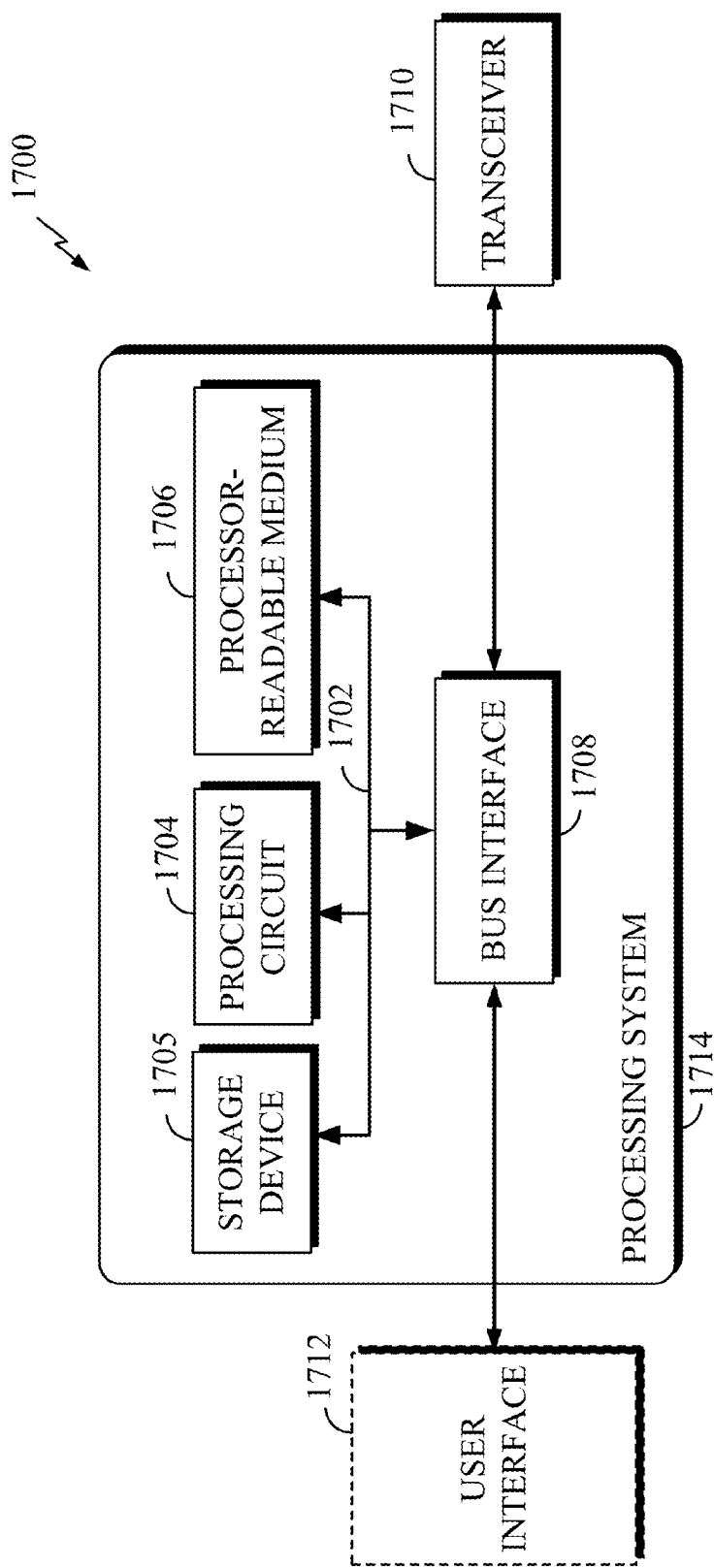
FIG. 17 illustrates an exemplary processing system in which components of the systems and devices of FIGS. 1-16 may be incorporated.

FIG. 17 illustrates an overall system or apparatus 1700 in which the components and methods of FIGS. 1-16 may be implemented. In accordance with various aspects of the disclosure, an element, or any portion of an element, or any combination of elements may be implemented with a processing system 1714 that includes one or more processing circuits 1704 such as the overall processor platform of FIG. 1. For example, apparatus 1700 may be a user equipment (UE) of a mobile communication system. Examples of processing circuits 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, processing circuits 1704, as utilized in apparatus 1700, may be used to implement any one or more of the processes described above and illustrated in FIGS. 4, 12-14 and/or 16, such as processes to synchronize a TDM bus. In particular, processing circuit 1704 may be configured to: transmit control signals along the bidirectional transmission line to a second device; track a phase count as the control signals are transmitted to the second device along the bidirectional transmission line; temporarily suspend the transmission of the control signals based on the phase count to allow the first device to receive or otherwise obtain a synchronization indicator signal from the second device along the bidirectional transmission line; and verify synchronization with the second device based on whether a synchronization indicator signal is obtained from the second device while transmission is temporarily suspended.

In this example, processing system 1714 may be implemented with a bus architecture, represented generally by the bus 1702, which can be separate from the aforementioned serial TDM bus. Bus 1702 may include any number of interconnecting buses and bridges depending on the specific application of processing system 1714 and the overall design constraints. Bus 1702 links various circuits including one or more processing circuits (represented generally by the processing circuits 1704), memory storage device 1705, and processor-readable medium or computer-readable medium (generally represented by processor-readable 1706.) Bus 1702 may also link various other circuits such as timing sources, peripherals, voltage regulators, and power management circuits, which are well known in the art, and therefore, will not be described any further. Bus interface 1708 provides an interface between bus 1702 and a transceiver 1710. Transceiver 1710 provides a means for communicating with various other apparatus over a transmission medium. Depending upon the nature of the apparatus, a user interface 1712 (e.g., keypad, display, speaker, microphone, joystick) may also be provided.

Processor or processing circuit 1704 is responsible for managing bus 1702 and general processing, including the execution of software stored on the processor-readable medium 1706. The software, when executed by processor 1704, causes processing system 1714 to perform the various functions described herein for any particular apparatus. Processor-readable medium 1706 may also be used for storing data that is manipulated by processor 1704 when executing software. In particular, processor-readable storage medium 1706 may have one or more instructions which when executed by processing circuit 1704 causes processing circuit 1704 to: transmit control signals along a bidirectional transmission line of a serial TDM bus from a first device to a second device; track a phase count of the first device as the control signals are transmitted to the second device along the bidirectional transmission line; temporarily suspend the transmission of the control signals based on the phase count to allow the first device to receive a synchronization indicator signal from the second device along the bidirectional transmission line; and verify synchronization of the first and second devices based on reception of a synchronization indicator signal from the second device while transmission is temporarily suspended by the first device.

One or more processors 1704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The software may reside on computer-readable or processor-readable medium 1706. As noted, processor-readable medium 1706 may be a non-transitory processor-readable medium. A non-transitory processor-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a computer. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices. The processor-readable medium may also include, by way of example, a carrier wave, a transmission line, and any other suitable medium for transmitting software and/or instructions that may be accessed and read by a computer. Processor-readable medium 1706 may reside in processing system 1714, external to processing system 1714, or distributed across multiple entities including processing system 1714. Processor-readable medium 1706 may be embodied in a computer program product. By way of example, a computer program product may include a processor-readable medium in packaging materials. Those skilled in the art will recognize how best to implement the described functionality presented in this disclosure depending on the particular application and the overall design constraints imposed on the overall system.

One or more of the components, steps, features, and/or functions illustrated in the figures may be rearranged and/or combined into a single component, step, feature or function or embodied in several components, steps, or functions. Additional elements, components, steps, and/or functions may also be added without departing from the invention. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

Hence, in one aspect of the disclosure, the processing circuits illustrated in, e.g., FIGS. 11 and 15 may be a specialized processor (e.g., an ASIC)) that is specifically designed and/or hard-wired to perform the algorithms, methods, and/or steps described in FIGS. 4, 12-14 and/or 16. Thus, such a specialized processor (e.g., ASIC) may be one example of a means for executing the algorithms, methods, and/or steps described in FIGS. 4, 12-14 and/or 16. The processor-readable storage medium may store instructions that when executed by a specialized processor (e.g., ASIC) causes the specialized processor to perform the algorithms, methods, and/or steps described herein.

Also, it is noted that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for controlling a serial time-division-multiplexed (TDM) bus operable by a first device connected to the bus, comprising:
    transmitting control signals along a bidirectional transmission line of the bus to a second device also connected to the bus;
    tracking a phase count of the first device as the control signals are transmitted to the second device along the bidirectional transmission line;
    temporarily suspending the transmission of the control signals based on the phase count to allow the first device to obtain a synchronization indicator signal from the second device along the bidirectional transmission line; and
    verifying synchronization of the first and second devices based on whether a synchronization indicator signal is obtained from the second device while transmission is temporarily suspended by the first device.

2. The method of claim 1 wherein verifying synchronization of the first and second devices comprises:
    confirming that the first and second devices are synchronized if a synchronization indicator signal is obtained by the first device while transmission is temporarily suspended; and
    detecting that the first and second devices are not synchronized if a synchronization indicator signal is not obtained by the first device while transmission is temporarily suspended.

3. The method of claim 2 wherein, upon detection of a lack of synchronization, a synchronization error indicator is produced.

4. The method of claim 1 wherein the phase count of the first device is a bit count corresponding to a sequence of bits transmitted by the first device along the bidirectional transmission line to the second device.

5. The method of claim 1 wherein temporarily suspending the transmission of the control signals to allow the first device to obtain a synchronization indicator signal is performed periodically based on the phase count of the first device.

6. The method of claim 5 wherein temporarily suspending the transmission of the control signals is performed when the phase count of the first device reaches a predetermined number.

7. The method of claim 1 wherein transmitting control signals along the bidirectional serial data transmission line comprises transmitting control words.

8. The method of claim 7 further comprising performing a cyclic redundancy check (CRC) on the control words to detect whether there is a data transmission problem with the control words and, upon detection of a data transmission problem with the control words, producing a CRC error indicator.

9. The method of claim 1 further comprising transmitting data to the second device along at least one unidirectional data transmission line of the bus concurrently with the transmission of the control signals along the bidirectional transmission line.

10. The method of claim 9 further comprising performing a learning mode training cycle to initially synchronize the first device with the second device before transmission of data.

11. The method of claim 10 wherein the first device comprises to an audio processor subsystem and the second device comprises a coder-decoder (CODEC) subsystem and wherein the data transmitted to the second device comprises unframed serial audio data.

12. The method of claim 10 wherein data is transmitted along the at least one unidirectional data transmission line at a rate substantially greater than a rate by which control signals are transmitted over the bidirectional transmission line.

13. The method of claim 1 further comprising obtaining data from the second device along at least one unidirectional data transmission line of the bus concurrently with the transmission of the control signals along the bidirectional transmission line.

14. The method of claim 13 wherein the first device comprises to an audio processor subsystem and the second device comprises a CODEC subsystem and wherein the data obtained from the second device comprises unframed serial audio data.

15. The method of claim 1 wherein the first device comprises a state machine and the second device comprises a state machine.

16. A first device coupled to a serial time-division-multiplexed (TDM) bus having a bidirectional transmission line, the first device having a processing circuit configured to:
    transmit control signals along the bidirectional transmission line to a second device;
    track a phase count as the control signals are transmitted to the second device along the bidirectional transmission line;
    temporarily suspend the transmission of the control signals based on the phase count to allow the first device to obtain a synchronization indicator signal from the second device along the bidirectional transmission line; and
    verify synchronization with the second device based on whether a synchronization indicator signal is obtained from the second device while transmission is temporarily suspended.

17. The device of claim 16 wherein the processing circuit is further configured to a produce a synchronization error indicator upon detection of a lack of synchronization.

18. The device of claim 16 wherein the processing circuit is further configured to control transmission of data signals to the second device along one or more unidirectional data transmission lines of the TDM bus concurrently with the transmission of the control signals along the bidirectional transmission line.

19. The device of claim 18 wherein the processing circuit is further configured to perform a learning mode training cycle to initially synchronize the first device with the second device before transmission of data signals.

20. The device of claim 16 wherein the processing circuit is further configured to perform a cyclic redundancy check (CRC) on control words to be transmitted over the bidirectional transmission line to detect whether there is a data transmission problem with the control words.

21. The device of claim 16 wherein the processing circuit is further configured to obtain a system clock signal for transmission to the second device along a separate unidirectional clock line of the TDM bus.

22. The device of claim 16 wherein the processing circuit is configured to operate as a state machine.

23. A device, comprising:
 means for transmitting control signals along a bidirectional transmission line of the bus to a second state machine also connected to the bus;
 means for tracking a phase count of the first state machine as the control signals are transmitted to the second state machine along the bidirectional transmission line;
 means for temporarily suspending the transmission of the control signals based on the phase count to allow the first device to obtain a synchronization indicator signal from the second state machine along the bidirectional transmission line; and
 means for verifying synchronization of the first and second state machines based on whether a synchronization indicator signal is obtained from the second state machine while transmission is temporarily suspended by the first state machine.

24. The device of claim 23 wherein the means for verifying synchronization of the first and second devices comprises:
 means for confirming that the first and second devices are synchronized if a synchronization indicator signal is obtained by the first device while transmission is temporarily suspended; and
 means for detecting that the first and second devices are not synchronized if a synchronization indicator signal is not obtained by the first device while transmission is temporarily suspended.

25. The device of claim 24 further comprising means for producing a synchronization error indicator upon detection of a lack of synchronization.

26. The device of claim 23 further comprising means for controlling transmission of data signals to the second device along one or more unidirectional data transmission lines of the TDM bus concurrently with the transmission of the control signals along the bidirectional transmission line.

27. A non-transitory processor-readable storage medium having one or more instructions which when executed by at least one processing circuit causes the at least one processing circuit to:
 transmit control signals along a bidirectional transmission line of a serial time-division-multiplexed (TDM) bus from a first device to a second device;
 track a phase count of the first device as the control signals are transmitted to the second device along the bidirectional transmission line;
 temporarily suspend the transmission of the control signals based on the phase count to allow the first device to allow the first device to obtain a synchronization indicator signal from the second device along the bidirectional transmission line; and
 verify synchronization of the first and second devices based on reception of a synchronization indicator signal from the second device while transmission is temporarily suspended by the first device.

28. The processor-readable storage medium of claim 27 wherein the processor-readable storage medium further includes one or more instructions which when executed by at least one processing circuit causes the at least one processing circuit to verify synchronization of the first and second devices by:
 confirming that the first and second devices are synchronized if a synchronization indicator signal is obtained by the first device while transmission is temporarily suspended; and
 detecting that the first and second devices are not synchronized if a synchronization indicator signal is not obtained by the first device while transmission is temporarily suspended.

29. The processor-readable storage medium of claim 28 wherein the processor-readable storage medium further includes one or more instructions which when executed by at least one processing circuit causes the at least one processing circuit to produce a synchronization error indicator upon detection of a lack of synchronization.

30. The processor-readable storage medium of claim 27 wherein the processor-readable storage medium further includes one or more instructions which when executed by at least one processing circuit causes the at least one processing circuit to control transmission of data signals from the first device to the second device along one or more unidirectional data transmission lines of the TDM bus concurrently with the transmission of the control signals along the bidirectional transmission line.

* * * * *